3,364,154
FOAMING COMPOSITIONS
Thomas Gilchrist, Prestwick, Scotland, and Mirko Ternbah, Beloeil, Quebec, Canada, assignors to Canadian Industries Limited, Montreal, Quebec, Canada, a corporation of Canada
No Drawing. Filed Mar. 5, 1965, Ser. No. 437,587
Claims priority, application Canada, Aug. 18, 1964, 909,795
8 Claims. (Cl. 260—2.5)

ABSTRACT OF THE DISCLOSURE

Foamed cellular polymeric materials formed by a foaming reaction wherein a mixture of two dihydropyranyl compounds is polymerized in the presence of volatile foaming agent. The first dihydropyranyl compound is characterized by having its dihydropyranyl groups linked by an ester group. The second dihydropyranyl compound is an aldol condensation product of a dihydropyran carboxaldehyde. The combination of the two types of dihydropyranyl compounds provides cellular materials having properties superior to those of cellular materials derived from either compound alone.

---

This invention relates to improved compositions suitable for the production of foamed cellular polymeric materials and to improved foamed cellular polymeric materials obtained therefrom.

In Canadian application Ser. No. 873,718 filed by W. D. S. Bowering, N. B. Graham and J. D. Murdock, on Apr. 20, 1963, there are described foamable compositions of a novel type which comprise at least one polymerizable vinyl ether containing at least two vinyl groups per molecule, a foaming agent, an acidic catalyst and, optionally, at least one compound reactive with said vinyl ether such as a polyhydric phenol, an aliphatic polyhydric alcohol, an epoxidized material, a polycarboxylic acid, a polyamide, a polycarbamate or an α,β-monoethylenically unsaturated compound. The compositions yield foamed cellular polymeric materials which are superior to the known polyurethane and polystyrene foams in many respects.

In spite of their many useful properties, however, foams made from some of the vinyl ethers tend to be very brittle. For example, a foamable composition comprising 3,4 - dihydro - 2H - pyran-2-methyl-(3,4-dihydro-2H-pyran-2-carboxylate), a foaming agent and an acidic catalyst yield a brittle charred foam which breaks down after a few days exposure to boiling water. When the vinyl ether employed in combination with a foaming agent and an acidic catalyst is the aldol condensation product of 2-formyl-3,4-dihydro-2H-pyran, the resulting foam is extremely brittle and weak although it has good hydrolytic stability. For commercial applications, it is desirable that the foams possess hydrolytic stability and resiliency, and flow readily during the foaming process.

It has now been found that foamable compositions comprising a combination of a cyclic vinyl ether wherein dihydropyranyl radicals are linked by ester groups and a cyclic vinyl ether which is the aldol condensation product of a dihydropyran carboxaldehyde, yield foams which are both hydrolytically stable and flow readily. The addition to the ethers of materials such as polyhydric phenols, chlorinated phenols, carboxylic acids, polyols, polyepoxides, mono vinyl derivatives or organic polyisocyanates results in foams which are resilient in addition to possessing hydrolytic stability.

It is therefore the primary object of this invention to provide improved foamable compositions and improved foamed cellular polymeric materials based on polymerizable vinyl ethers containing at least two vinyl groups per molecule optionally admixed with vinyl ether-reactive compounds. Another object is to provide such foamed cellular polymeric materials having the desirable properties of hydrolytic stability and convenient foaming characteristics. Additional objects will appear hereinafter.

The foamable compositions of this invention comprise, (1) at least one polymerizable cyclic vinyl ether containing dihydropyranyl radicals linked by ester groups, (2) at least one polymerizable cyclic vinyl ether constituted by the aldol condensation product of a dihydropyran carboxaldehyde, (3) a catalyst, (4) a foaming agent and, optionally, (5) a vinyl ether-reactive compound. The chemical interaction of the ingredients of said compositions produce the improved foams of this invention.

The foamable composition of this invention may also include flame retardants, surfactants, dyes, fillers, stabilizers, antioxidants, plasticizers and viscosity modifiers.

The polymerizable vinyl ethers suitable for use in the foamable compositions are (1) those in which two or more dihydropyranyl groups are linked by ester linkages and (2) those formed by an aldol-type condensation of two or more dihydropyran carboxaldehydes. Dihydropyranyl compounds of these types are described in U.S. Patent Nos. 2,481,377 and 2,537,921 and in British Patent No. 770,381 and examples thereof are 3,4-dihydro-2H - pyran - 2 - methyl-(3,4-dihydro-2H-pyran-2-carboxylate) I and 2(2-formyl-3,4-dihydro-1,2-pyranyl)2-(3,4-dihydro-1,2-pyranyl) carbinol II, having the following formulae

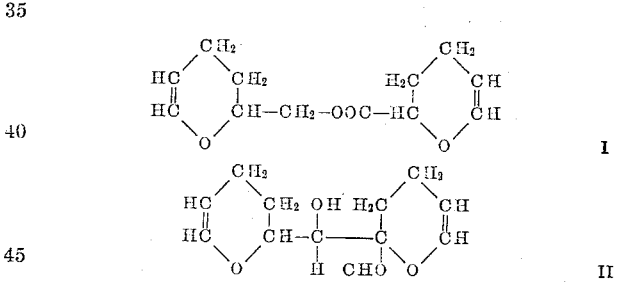

The hydrogen atoms in the pyranyl rings may be replaced by substituent groups but it is not desirable to have more than one carbon atom adjacent to the dihydropyranyl double bond bearing such substituent groups.

A preferred aldol-linked dihydropyranyl compound is the trimer formed by the aldol condensation of 2-formyl-3,4-dihydro-2H-pryan at 30° C. in the presence of sodium hydroxide catalyst. It is believed that said trimer is a mixture of trimeric condensation products, the main ones being:

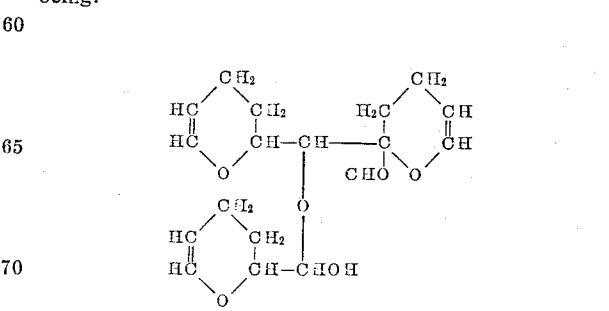

and

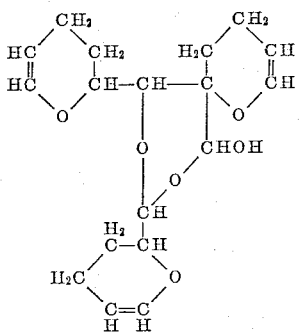

One mole of 2-formyl-3,4-dihydro-2H-pyran can be obtained from each mole of the freshly prepared trimer by distillation at 60° C. under pressure of 14 mm. of mercury.

The catalysts suitable for promoting the reactions of the polymer-forming ingredients of the foamable compositions may be either acidic or non-acidic and include all catalysts capable of accelerating the reaction of vinyl ethers with compounds containing active hydrogen atoms.

The acidic catalysts suitable for promoting the reactions include the strong proton donating acids, such as p-toluenesulphonic acid, and the Lewis acids such as trimethoxyboroxine and borontrifluoride conveniently employed as the etherate, $BF_3(C_2H_5)_2O$.

Other materials which are suitable as acidic catalytic ingredients are ferric chloride, stannic chloride, phosphorus pentachloride, phosphoric acid, perchloric acid, acetic acid, trifluoro acetic acid, trichloro acetic acid, fluoboric acid, borontrifluoride dihydrate, hydrogen fluoride, antimony pentafluoride, hexafluorophosphoric acid, lead fluoborate, antimony fluoborate, fluosilicic acid, sulphuric acid and silicotungstic acid.

Examples of suitable non-acidic catalysts include iodine and iodine containing compounds such as iodine chloride, iodine bromide, iodine perchlorate, iodine acetate, iodine triphosphate, and iodine triacetate; triphenylmethyl derivatives of anions having a low ester forming tendency, for example, triphenyl-methylperchloride, hexachloro antimony, chloromercurate, chlorozincate and chloroaluminate; alkyl, acyl and aroyl perchloride and hexachloro antimonates such as tertiary butyl, acetyl and benzoyl compounds; and di azonium salts such as diazoniumchloride, fluoborate and hexachloro antimonates.

It is possible to control the polymerization reaction by employing catalyst combinations for example, p-toluenesulphonic acid and boron trifluoride or boron trifluoride and trimethoxyboroxine. When Lewis acids are used as catalysts in foaming compositions devoid of phenolic, alcoholic or carboxylic acid ingredients, it is often advantageous to incorporate into the compositions small amounts of co-catalysts such as water, alcohols or carboxylic acids.

Volatile foaming agents suitable for use in the foamable compositions of this invention are those which are soluble or dispersible in the other ingredients of the foamable compositions, and are sufficiently volatile that they vaporize during the formation of the foamed polymeric materials. The heat of the catalyzed polymerization reaction causes the foaming agent to boil and the vapour forms bubbles which expand during the polymerization reaction to give a low density foamed polymerized mass. Preferred foaming agents are the halogenated hydrocarbons such as trichloromonofluoromethane, dichlorotetrafluoroethane, trichlorotrifluoroethane, dibromodifluoromethane, dichlorohexafluorocyclobutane, methylene chloride, chloroform, trichloroethylene, carbon tetrachloride and perchloroethylene.

The vinyl ether-reactive compounds suitable for use in the compositions of this invention include polyhydric phenols such as resorcinol, phloroglucinol, cathecol, hydroquinone, 2:2-di-p-hydroxyphenyl propane, chlorinated phenols such as pentachlorophenol and the resinous product derived from pine wood comprising about 14% hydrocarbons, 26% resin acid, 60% phenolic products sold commercially as "Vinsol" resin; polyhydric alcohols such as ethylene glycol, glycerol, diethylene glycol, 1,5-pentane diol, 1,2,6-hexane triol, polypropylene glycols, castor oil, blown castor oil, and diglyceryl tetrachlorophthalate; epoxidized materials such as dipentene dioxide, vinyl cyclohexene dioxide, polyallylglycidyl ether, diphenylol propane-diglycidyl ether, epoxidized polybutadiene, and the resinous condensate of epichlorohydrin and 2:2 - di - p-hydroxyphenyl propane; polycarboxylic acids such as succinic, adipic, azelaic, maleic, fumaric, itaconic, phthalic, isophthalic, t-phthalic, trimellitic, trimesic and chlorendic acids and polymerized unsaturated fatty acids such as dimer and trimer acids; polyamides such as the di-amide derived from dimerized linseed oil acids and the polyamide derived from isophthalic acid and pentamethylene diamine; $\alpha,\beta$-monoethylenically unsaturated compounds such as 3,4-dihydro-2H-pyran, 2-ethoxy - 3,4-dihydro-2H-pyran, 2-alkyl-3,4-dihydro-2H-pyran, 2-phenyl-3,4-dihydro-2H-pryan, 1-decene, vinyl stearate, lauryl vinyl ether, dibutyl maleate, maleic anhydride, vinyl cyclohexene, alkyl acrylates, alkyl methacrylates and styrene; and organic polyisocyanates such as tolylene 2,4-diisocyanate, mixtures of tolylene 2,4- and 2,6-diisocyanates, diphenylmethane diisocyanate, 4,4'-diisocyanate-3-methyl-diphenyl methane, m- and p-phenylene diisocyanates and chlorophenylene-2,4-diisocyanate.

Suitable flame retardants for incorporation in the foamable compositions include trichloroethylphosphate, tris(dibromopropyl) phosphate, 2:2-bis-(3',5'-dibromo-4'-hydroxyphenyl) propane, chlorendic acid, brominated castor oil, and polyvinyl chloride, with or without antimony oxide. The phenolic compound and the chlorendic acid serve both as flame retardants and vinyl ether-reactive materials.

The preferred surfactants are those of the silicone type, examples of which are disclosed in Belgian Patents Nos. 582,362 and 584,089 being of the siloxane oxyalkylene copolymer type.

The relative proportions of the ester-linked dihydropyranyl compound to the aldol-linked dihydropyranyl compound in the compositions lie within the range of 10 to 1 and 1 to 10 by weight. The ingredients containing dihydropyranyl groups together may make up from 40 to 98% by weight of the foamable compositions and the foaming agent is present in amounts between 2% and 30% by weight of the compositions. The catalyst is employed in amounts between from 0.005% to 2.0% by weight of the compositions, but this proportion is adjustable to the temperature of operation and the foam induction period required. The vinyl ether-reactive compound may constitute up to 30% by weight of the compositions.

Foams prepared from compositions containing only the ester linked and aldol residue linked vinyl ethers as reactive ingredients have adequate flow properties but are hard and not resilient. The addition of up to 20% of a phenolic ingredient to these compositions improves the flow characteristics and yields a more resilient foam. Sometimes the foams from compositions containing a phenolic ingredient have friable skins. This effect can be eliminated by the addition of up to 25% of a polyhydric alcohol such as polypropylene oxide derivatives of a low molecular weight diols or polyols, or low molecular weight hydroxyl containing esters such as castor oil or diglyceryl tetrachlorophthalate.

It may be convenient to carry out the preparation of the foamable compositions in two stages, i.e., by first reacting a portion of the vinyl ether compound with the vinyl ether-reactive ingredient to form a prepolymer, this prepolymer being employed in conjunction with the remainder of the vinyl ether ingredient to carry out the foaming reaction.

The foams of this invention are hydrolytically stable and may be obtained either in rigid or resilient form. In a rigid form, the foams are eminently suited for heat insulation and sound absorption, either in closed cavities or as enveloping blankets. In the resilient form, they may be used for upholstery, mattresses, etc.

The ingredients of the foamable compositions may simply be mixed by stirring in a vessel and then quickly pouring into a mould. In some cases it is convenient to heat the composition in the mould to assist in the formation of the foam. The foaming ingredients may also be mixed in the space which is to be filled with foam if it is suitably shaped. When such stirred mixing is used, it is highly desirable that a surfactant be added to the compositions in order to give foams of small bubbles. However, a surfactant is not always essential. For example, in certain foam dispensing machines, the ingredients are mixed under pressure using a foaming agent which is gaseous at the mixing temperature, the pressure being controllably released, and the frothed mixture is then dispersed to the point of use. In such a frothing machine, a surfactant is not essential.

However, in ordinary dispensing machines, wherein the foaming compositions are dispensed before foaming starts, the use of a surfactant is often desirable. In many recipes, it has been found that reduction of the amount of surfactant to the point where the bubbles just burst as polymerization is complete gives foams of the known "open cell" structure.

The invention will be more fully illustrated by the following examples, but it is to be understood that its scope is not limited to the specific embodiments shown. Parts and percentages given are by weight unless otherwise indicated.

The aldol residue-linked dihydropyranyl compound employed in the following examples can be prepared by the slow addition of concentrated aqueous sodium hydroxide to a 77% v./v. solution of 2-formyl-3,4-dihydro-2H-pyran in trichloromonofluoromethane. Although the exact structure of the product is not known it is believed to be a trimer of 2-formyl-3,4-dihydro-2H-pyran. In the examples this material is designated as the "aldol trimer of 2-formyl-3,4-dihydro-2H-pyran." During the preparation a part of the trichloromonofluoromethane is lost by evaporation so that the final product contains approximately 20% by volume of trichloromonofluoromethane.

*Example 1*

A homogeneous mixture was prepared from the following ingredients: 3,4-dihydro-2H-pyran-2-methyl-(3,4-dihydro-2H-pyran-2-carboxylate), aldol trimer of 2-formyl-3,4-dihydro-2H-pyran dissolved in trichloromonofluoromethane in the proportions of 80/20 by volume, trichloromonofluoromethane and siloxane oxyalkylene copolymer type surfactant. A second homogeneous mixture was prepared containing, in addition to the components of the first mixture, diphenylmethane diisocyanate and the low molecular weight resinous condensate of epichlorohydrin and 2:2-di-p-hydroxyphenyl propane. To each mixture was added with vigorous stirring a portion of 10% solution of borontrifluoride etherate in diethylene glycol. The compositions and resulting foams are shown in Table I.

TABLE I

| 3,4-dihydro-2H-pyran-2-methyl-(3,4-dihydro-2H-pyran-2-carboxylate) (grams) | Aldol trimer of 2-formyl 3,4-dihydro-2H-pyran admixed with trichloromonofluoromethane (80/20 by volume) (grams) | Trichloromonofluoromethane (grams) | Siloxane oxyalkylene copolymer type surfactant (cc.) | Diphenylmethane diisocyanate (grams) | Resinous condensate of epichlorohydrin and 2:2-di-p-hydroxyphenyl propane (grams) | 10% boron trifluoride etherate in diethylene glycol (cc.) | Induction period (sec.) | Rise period (sec.) | Core density (lb./cu. ft.) | Force required for 10% compression parallel to rise direction (lb./sq. in.) | Force required for 10% compression perpendicular to rise direction (lb./sq. in.) |
|---|---|---|---|---|---|---|---|---|---|---|---|
| 300 | 75 | 45 | 3 | 0 | 0 | 6 | 107 | 38 | 1.8 | 13 | 8 |
| 400 | 300 | 30 | 2 | 30 | 50 | 12 | 42 | 23 | 1.6 | 14 | 7 |

*Example 2*

A series of compositions were prepared the ingredients being in two portions as follows:

| Mixture A | Mixture B |
|---|---|
| Aldol trimer of 2-formyl-3,4-dihydro-2H-pyran admixed with trichloromonofluoromethane (80/20 by volume). | Fluoboric acid/fluosilicic acid 45.5/2.7% solution in water. |
| 3,4-dihydro-2H-pyran-2-methyl-(3,4-dihydro-2H-pyran-2-carboxylate) admixed with pentachlorophenol. | Polypropylene glycol of molecular weight 2025. |
| Low molecular weight resinous condensate of epichlorohydrin and 2:2-di-p-hydroxyphenyl propane. | |
| Diphenylmethane diisocyanate. | |
| Siloxane oxyalkylene copolymer type surfactant. | |

Mixture B was added to Mixture A with vigorous stirring and the mixture was then poured into a mould. The proportions of the ingredients and characteristics of the resulting foams are shown in Table II.

TABLE II

| Aldol trimer of 2-formyl-3,4-dihydro-2H-pyran admixed with trichloromonofluoromethane (80/20 by volume) (grams) | 3,4-dihydro-2H-pyran-2-methyl-(3,4-dihydro-2H-pyran-2-carboxylate) (grams) | Proportion of 3,4-dihydro-2H-pyran-2-methyl-(3,4-dihydro-2H-pyran-2-carboxylate) to pentachlorophenol (ratio by wt.) | Low molecular weight resinous condensate of epichlorohydrin and 2:2-di-p-hydroxyphenyl propane (grams) | Diphenylmethane diisocyanate (grams) | Siloxane oxyalkylene copolymer type surfactant (cc.) | Fluoboric acid/fluosilicic acid 45.5/2.7% in water (cc.) | Polypropylene glycol of MW 2025 (grams) | Induction time of foam (sec.) | Rise time of foam (sec.) | Force required for 10% and 20% compression parallel to direction of rise (lb./sq. in.) | Force required for 10% and 20% compression perpendicular to direction of rise (lb./sq. in.) | Core density of foam (lb./sq. in.) |
|---|---|---|---|---|---|---|---|---|---|---|---|---|
| 200 | 100 | 2:1 | 30 | 10 | 2 | 1.5 | 20 | 5 | 20 | | | |
| 200 | 100 | 2:1 | 20 | 15 | 2 | 1.5 | 20 | 10 | 20 | 23.6 (10%) / 23.8 (20%) | 5.2 (10%) / 6.7 (20%) | [1] 2.07 |
| 175 | 125 | 2:1 | 20 | 15 | 2 | 1.5 | 20 | 10 | 25 | 29.5 (10%) / 29.5 (20%) | 7.1 (10%) / 8.5 (20%) | [1] 2.44 |
| [2] 175 | 125 | 2:1 | 20 | 15 | 2 | 1.5 | 20 | 15 | 40 | | | |
| 200 | 100 | 1:1 | 20 | 15 | 2 | 1.5 | 20 | 15 | 30 | | | |
| 175 | 125 | 1:1 | 20 | 20 | 2 | 1.5 | 20 | [3] | | | | |
| 175 | 125 | 1:1 | 20 | 20 | 2 | 1.3 | 20 | 10 | 20 | | | |

[1] 1 inch cubes of these foams withstood boiling for 3 weeks in water without noticeable change.
[2] 20 cc. of trichloromonofluoromethane added to Mixture A.
[3] Instantaneous.

Example 3

The two following mixtures were prepared:

| Mixture A | Mixture B |
|---|---|
| Aldol trimer of 2-formyl-3,4-dihydro-2H-pyran admixed with trichloromonofluoromethane (80/20 by volume), 225 grams. 1:1 mixture of 3,4-dihydro-2H-pyran-2-methyl-(3,4-dihydro-2H-pyran-2-carboxylate) and chlorendic anhydride, 75 grams. Low molecular weight resinous condensate of epichlorohydrin and 2:2-di-p-hydroxy-phenyl propane, 60 grams. Siloxane oxyalkylene copolymer type surfactant, 2 grams. | Fluoboric acid/fluosilicic acid 45.5/2.7% in water, 1.2 cc. Polypropylene glycol of 2025 molecular weight, 20 grs. |

Mixture B was added to Mixture A with vigorous stirring. After an induction period of 20 seconds a sticky, white, weak, even textured, resilient foam was formed with a rise time of 50 seconds. After curing in an oven at 60° C. for 2 minutes the skin became tack free. The foam shrank overnight.

When there were added to Mixture A 20 parts of diphenyl methane diisocyanate and an additional 20 parts of the low molecular weight resinous condensate of epichlorohydrin and 2:2-di-p-hydroxyphenyl propane the shrinkage and stickiness of the resulting foam was reduced. This foam in 1 inch cubes was maintained in boiling water for 1 week, during which time it retained approximately its original shape but shrank slightly. The pH of the aqueous solution fell to 6.

Example 4

The two following mixtures were prepared:

| Mixture A | Mixture B |
|---|---|
| Aldol trimer of 2-formyl-3,4-dihydro-2H-pyran admixed with trichloromonofluoromethane (80/20 by volume), 225 grams. 1:1 mixture of 3,4-dihydro-2H-pyran-2-methyl-(3,4-dihydro-2H-pyran-2-carboxylate) and chlorendic anhydride, 75 grams. Low molecular weight resinous condensate of epichlorohydrin and 2:2-di-p-hydroxy phenyl propane, 60 grams. Siloxane oxyalkylene copolymer type surfactant, 2 grams. | Boron trifluoride etherate in polypropylene glycol of molecular weight 2025 (1:5), 10 cc. Polypropylene glycol of molecular weight 2025, 10 grams. |

Mixture B was added to Mixture A with vigorous stirring. After an induction period of 15 seconds a foam was formed which rose for 50 seconds.

Example 5

The two following mixtures were prepared:

| Mixture A | Mixture B |
|---|---|
| Aldol trimer of 2-formyl-3,4-dihydro-2H-pyran admixed with trichloromonofluoromethane (80/20 by volume), 225 grams. 1:1 mixture of 3,4-dihydro-2H-pyran-2-methyl-(3,4-dihydro-2H-pyran-2-carboxylate) and chlorendic anhydride, 75 grams. Low molecular weight resinous condensate of epichlorohydrin and 2:2-di-p-hydroxyphenyl propane, 60 grams. | Boron trifluoride etherate in polypropylene glycol of MW 2025 (1:4), 10 cc. Polypropylene glycol of MW 2025, 30 grams. |

Mixture B was added to mixture A with vigorous stirring. After an induction period of 15 seconds a foam with rise time of 20 seconds was formed.

Example 6

The following stock solution was prepared:

|  | Grams |
|---|---|
| Aldol trimer of 2-formyl-3,4-dihydro-2H-pyran admixed with trichloromonofluoromethane (80/20 by volume) | 2000 |
| Trichloromonofluoromethane | 1000 |
| 3,4 - dihydro - 2H-pyran-2-methyl-(3,4-dihydro-2H-pyran-2-carboxylate) | 400 |
| Tetrachlorodiglycerylphthalate | 400 |

The following two mixtures were prepared:

| Mixture A | Mixture B |
|---|---|
| Stock solution above, 300 grams. Low molecular weight resinous condensate of epichlorophydrin and 2:2-di-p-hydroxy-phenyl propane, 60 grams. Siloxane oxyalkylene copolymer type silicone surfactant, 2 grams. | Boron trifluoride etherate polypropylene glycol (1:4), 8 cc. Polypropylene glycol of molecular weight 2025, 30 g. |

Mixture B was added to Mixture A with vigorous stirring. After an induction period of 35 seconds and rise time of 55 seconds a white, resilient, even textured foam with good skin was formed.

Example 7

The following two mixtures were prepared:

| Mixture A | Mixture B |
|---|---|
| Stock solution (as in Example 6), 300 grams. Low molecular weight resinous condensate of epichlorohydrin and 2:2-di-p-hydroxyphenyl propane, 80 grams. Siloxane oxyalkylene copolymer type silicone surfactant, 2 grams. | Fluoboric acid/fluosilicic acid, 45.5/2.7% in water, 1.3 cc. Polypropylene glycol of molecular weight 2025, 20 grams. |

Mixture B was added to Mixture A with vigorous stirring. After an induction period of 20 seconds and a rise time of 25 seconds a white, resilient, hard foam which was not sticky was formed.

When 15 grams of diphenylmethane diisocyanate were added to Mixture A and an additional 0.3 cc. of the fluoboric acid/fluosilicic acid catalyst were added to Mixture B a harder foam resulted. When 1 inch cube samples of the latter foam were maintained in boiling water for 1 week no change in structure or shape was observed.

Example 8

The following two mixtures were prepared:

| Mixture A | Mixture B |
|---|---|
| Aldol trimer of 2-formyl-3,4-dihydro-2H-pyran admixed with trichloromonofluoromethane (80/20 by volume), 246 grams. Reaction product of ethylene glycol and 3,4-dihydro-2H-pyran-2-methyl-(3,4-dihydro-2H-pyran-2-carboxylate) (1:2.3 moles), 36 grams. Siloxane oxyalkylene copolymer type silicone surfactant, 2 grams. | Fluoboric acid/fluosilicic acid, 45.5/2.7% in water, 1 cc. Polypropylene glycol of molecular weight 2025, 10 grams. |

Mixture B was added to Mixture A with vigorous stirring. After an induction period of 10 seconds and a rise time of 40 seconds a white, soft, fine textured but powdery foam resulted.

When the composition was modified by the addition of 10 grams of diphenylmethane diisocyanate to Mixture A and 0.2 cc. of the fluoboric acid/fluosilicic catalyst to Mixture B the induction and rise times of the resulting foams were increased by 5 seconds and the quality of the foam was unchanged.

When the composition was modified by the addition to

Mixture A of 40 parts of the low molecular weight resinous condensate of epichlorohydrin and 2:2-di-p-hydroxyphenyl propane, and 20 grams of diphenylmethane diisocyanate; and the addition to Mixture B of 10 grams of polypropylene glycol of molecular weight 2025 and replacement of the fluoboric acid/fluosilicic acid catalyst by 1 cc. of boron trifluoride etherate (48%) in 1:2 mixture with polypropylene glycol of molecular weight 2025 the characteristics of the resulting foams were not altered appreciably. The omission of the diphenylmethane diisocyanate ingredient did not result in a noticeable change in the foam.

*Example 9*

A stock solution was prepared containing:

| | Parts |
|---|---|
| Aldol trimer of 2-formyl-3,4-dihydro-2H-pyran admixed with trichloromonofluoromethane (80/20 by volume) | 100 |
| 3,4 - dihydro - 2H-pyran-2-methyl-(3,4-dihydro-2H-pyran - 2 - carboxylate) admixed with 2:2 - di-hydroxyphenyl propane (4:1) | 20 |

Mixture B was added to Mixture A with vigorous stirring. After an induction period of 35 seconds a foam was formed with a rise time of 40 seconds.

A series of 8 foams of this formulation was prepared. In general these foams were white, even textured but weak and friable.

When the composition was modified by the addition to Mixture A of 20 gram and 30 gram portions of a 1:1 or 2:1 blend of 3,4 - dihydro - 2H-pyran-2-methyl-(3,4-dihydro-2H-pyran-2-carboxylate) and 2:2 di-p-hydroxyphenyl propane the foams produced possessed substantially the same properties.

*Example 10*

A series of three foams was prepared by adding the following Mixture B to Mixture A with vigorous stirring. The composition and resulting foams are shown in Table III.

TABLE III

| Mixture A | | | | | | | Mixture B | | | Remarks |
|---|---|---|---|---|---|---|---|---|---|---|
| Aldol trimer of 2-formyl-3,4-dihydro-2H-pyran/trichloromonofluoromethane (80/20 by volume) (grams) | 3,4-dihydro-2H-pyran-2-methyl-(3,4-dihydro-2H-pyran-2-carboxylate) (grams) | Low molecular weight resinous condensate of epichlorohydrin and 2:2-di-p-hydroxyphenyl propane (grams) | Styrene (grams) | Methylated melamine formaldehyde resin (Vulcafor V D.xt) (grams) | Trichloromonofluoromethane (cc.) | | Fluoboric acid/fluosilicic acid 45.5/2.7% solution in water (cc.) | Induction period (sec.) | Rise time (sec.) | |
| 150 | 150 | 20 | 0 | 2 | 7 | | 2 | 75 | 35 | White, brittle skin, scorched. |
| 150 | 150 | 20 | 5 | 2 | 7 | | 2 | 90 | 35 | Soft, sticky skin hardened in 3 minutes. |
| 150 | 150 | 20 | 5 | 1.5 | 7 | | 2 | 25 | 10 | Hard skin, no shrinkage. |

| Mixture A | Mixture B |
|---|---|
| Stock solution, 192 grams. Trichloromonofluoromethane, 48 grams. 3,4-dihydro-2H-pyran-2-methyl-(3,4-dihydro-2H-pyran-2-carboxylate), 48 grams. 2:2-di-p-hydroxyphenyl propane, 12 grams. Siloxane oxyalkylene copolymer type silicone surfactant, 2 grams. Low molecular weight resinous condensate of epichlorohydrin and 2:2-di-p-hydroxyphenyl propane, 60 grams. | Fluoboric acid/fluosilicic acid, 45.5/2.7% solution in water, 1.2 cc. Polypropylene glycol of molecular weight 2025, 20 grams. |

*Example 11*

The following stock solution was prepared:

| | |
|---|---|
| Aldol trimer of 2-formyl-3,4-dihydro-2H-pyran admixed with trichloromonofluoromethane (20/80 by volume) grams | 500 |
| 3,4 - dihydro - 2H - pyran - 2 - methyl - (3,4 - dihydro-2H-pyran-2-carboxylate) grams | 100 |
| Trichloromonofluoromethane cc | 300 |

Foams were prepared by mixing portions containing stock solution, low molecular weight resinous condensate of epichlorohydrin and 2:2-di-p-hydroxyphenyl propane and 10% p-toluene-sulphonic acid solution in ethylene glycol with portions containing boron trifluoride etherate catalyst and a polyol. The composition proportions and character of the foams are shown in Table IV.

TABLE IV

| Stock solution (grams) | Boron trifluoride etherate in polypropylene glycol of MW 425 (1:2) (cc.) | Low molecular weight resinous condensate of epichlorohydrin and 2:2-di-p-hydroxyphenyl propane (grams) | p-Toluenesulphonic acid 10% solution in ethylene glycol (cc.) | Polypropylene glycol of molecular weight 425 (grams) | Polypropylene glycol of molecular weight 2025 (grams) | Polyether, MW 1000 hydroxyl No. 168 (Triol LG 168) (grams) | Polyether, MW 700 hydroxyl No. 490 (Hexol LS 490) (grams) | Induction period (sec.) | Rise time (sec.) | Core density (lb./cu. ft.) |
|---|---|---|---|---|---|---|---|---|---|---|
| 30 | 0.6 | 0 | 0 | 0 | 0 | 0 | 0 | 10 | 10 | -------- |
| 30 | 0.6 | 0 | 0.2 | 0 | 0 | 0 | 0 | Instant | 10 | -------- |
| 30 | 0.4 | 0 | 0.2 | 0 | 0 | 0 | 0 | 5 | 15 | -------- |
| 30 | 0.4 | 1 | 0.2 | 0 | 0 | 0 | 0 | 6 | 20 | -------- |
| 30 | 0.4 | 2 | 0.2 | 0 | 0 | 0 | 0 | 6 | 30 | -------- |
| 30 | 0.4 | 3 | 0.2 | 0 | 0 | 0 | 0 | 6 | 35 | 1.17 |
| 30 | 0.5 | 3 | 0.2 | 0 | 0 | 0 | 0 | 4 | 20 | 1.26 |
| 60 | 1.0 | 6 | 0.4 | 0 | 0 | 0 | 0 | Instant | 30 | -------- |
| 30 | 0.5 | 3 | 0.2 | 0 | 0 | 0 | 0 | 15 | 35 | -------- |
| 30 | 0.5 | 3 | 0.2 | 2 | 0 | 0 | 0 | 20 | 35 | -------- |
| 60 | 1.0 | 7 | 0.4 | 4 | 0 | 0 | 0 | 20 | 35 | -------- |
| 30 | 0.5 | 4 | 0.2 | 0 | 2 | 0 | 0 | 25 | 40 | 1.38 |
| 30 | 0.5 | 4 | 0.2 | 0 | 3 | 0 | 0 | 30 | 40 | * |
| 30 | 0.7 | 4 | 0 | 0 | 3 | 0 | 0 | 75 | 20 | -------- |
| 30 | 0.6 | 4 | 0 | 0 | 2 | 0 | 0 | 45 | 25 | -------- |
| 30 | 0.6 | 4 | 0 | 0 | 3 | 0 | 0 | 50 | 25 | 1.66 |
| 30 | 0.6 | 4 | 0 | 0 | 3 | 0 | 0 | 110 | 30 | * |
| 60 | 1.2 | 0 | 0 | 0 | 0 | 5 | 0 | 65 | 45 | -------- |
| 60 | 1.2 | 0 | 0 | 0 | 0 | 0 | 5 | 45 | 40 | *1.54 |

*These foams did not break down after three weeks in boiling water.

Example 12

A stock solution was prepared containing:

| | Parts |
|---|---|
| Aldol trimer of 2-formyl-3,4-dihydro-2H-pyran admixed with trichloromonofluoromethane (80/20 by volume) | 200 |
| 3,4-dihydro-2H-pyran-2-methyl - (3,4 - dihydro - 2H-pyran-2-carboxylate) | 100 |

Foams were prepared by mixing portions containing stock solution, low molecular weight resinous condensate of epichlorohydrin and 2:2-di-p-hydroxyphenyl propane, and diphenylmethane diisocyanate and portions containing borontrifluoride etherate in polypropylene glycol of molecular weight 2025 (1:2) or fluoboric acid/fluosilicic acid, 45.5/2.7% solution in water, and polypropylene glycol of molecular weight 2025. The compositions and characteristics of the resulting foams are shown in Table V.

Example 13

A number of the following two mixtures were prepared:

| Mixture A | Mixture B |
|---|---|
| 3,4-dihydro-2H-pyran-2-methyl-(3,4-dihydro-2H-pyran-2-carboxylate) admixed with 2:2-di-p-hydroxyphenyl propane(4:1), 150 grams. Aldol trimer of 2-formyl-3,4-dihydro-2H-pyran admixed with trichloromonofluoromethane (80/20 by volume), 150 grams. Siloxane oxyalkylene copolymer type silicone surfactant, 2 grams. Low molecular weight resinous condensate of epichlorohydrin and 2:2-di-p-hydroxy phenyl propane, as in Table VI. Styrene, as in Table VI. Diphenylmethane diisocyanate, as in Table VI. | Trichlorofluoro-methane, 7 cc. Fluoboric acid/fluosilicic acid 45.5/2.7% solution in water, as in Table VI. Polypropylene glycol of molecular weight 2025, as in Table VI. |

TABLE V

| Stock solution (grams) | Boron trifluoride etherate in polypropylene glycol of MW 2025 (1:2) (cc.) | Fluoboric acid/fluosilicic acid 45.5/2.7% solution in water (cc.) | Low molecular weight resinous condensate of epichlorohydrin and 2:2-di-p-hydroxyphenyl propane (grams) | Diphenylmethane diisocyanate (grams) | Polypropylene glycol of MW 2025 (grams) | Induction time (sec.) | Rise time (sec.) | Density (lbs./cu. ft.) | Force required for 10% and 20% compression parallel to rise directn (lbs./sq. in.) | Force required for 10% and 20% compression perpendicular to rise direction (lbs./sq. in.) |
|---|---|---|---|---|---|---|---|---|---|---|
| 300 | 1.5 | -------- | 40 | 10 | 20 | 40 | 40 | *1.63 | 17(10%) / 17(20%) | -------- |
| 300 | -------- | 1.4 | 40 | 5 | 20 | 20 | 25 | -------- | -------- | -------- |
| 300 | -------- | 1.4 | 30 | 10 | 20 | 35 | 45 | -------- | 20.25(10%) / 20.5 (20%) | 5.1(10%) / 6.9(20%) |
| 300 | -------- | 1.5 | 30 | 10 | 20 | 35 | 30 | 2.1 | | |

*Foam withstood one week exposure in boiling water without breakdown.

Mixture B was added to Mixture A with vigorous stirring. The characteristics of the foams produced are shown in Table VI.

In general these foams lack strength and shrink on standing. They also tend to be scorched.

TABLE VI

| Variable Ingredients | | | | | | |
|---|---|---|---|---|---|---|
| Low molecular weight resinous condensate of epichlorohydrin and 2:2-di-p-hydroxy-phenyl propane (grams) | Styrene (grams) | Diphenylmethane diisocyanate (grams) | Fluoboric acid/ fluosilicic acid 45.5/2.7% solution in water (cc.) | Polypropylene glycol of molecular weight 2025 (grams) | Introduction Period (sec.) | Rise Time (sec.) |
| 20 | 10 | ---- | 1.0 | ---- | 5 | 15 |
| 20 | 10 | ---- | 1.4 | 10 | 5 | 10 |
| 20 | 10 | ---- | 1.4 | 20 | 12 | 15 |
| 20 | 10 | ---- | 1.4 | 30 | 30 | 20 |
| 20 | ---- | ---- | 1.4 | 40 | 35 | 30 |
| 20 | ---- | ---- | 1.4 | 50 | 55 | 30 |
| 20 | ---- | ---- | 1.4 | 60 | 75 | 30 |
| 30 | ---- | ---- | 1.4 | 50 | 55 | 25 |
| 30 | ---- | ---- | 1.4 | 40 | 35 | 20 |
| 40 | ---- | ---- | 1.4 | 40 | 45 | 35 |
| 40 | ---- | ---- | 1.4 | 40 | 35 | *25 |
| 40 | ---- | 5 | 1.4 | 40 | 45 | 25 |
| 10 | ---- | ---- | 1.2 | 40 | 55 | 30 |
| 10 | ---- | 10 | 1.5 | 40 | 30 | 20 |
| ---- | ---- | 10 | 1.5 | 60 | 65 | 20 |

* Heated mould.

*Example 14*

A series of foams was made from ingredients prepared in the following two mixtures:

| Mixture A | Mixture B |
|---|---|
| Aldol trimer of 2-formyl-3,4-dihydro-2H-pyran admixed with trichloromonofluoromethane (80/20 by volume). Trichloromonofluoromethane. Low molecular resinous condensate of epichlorohydrin and 2:2-di-p-hydroxyphenyl propane. Polypropylene glycol of molecular weight 2025. Styrene. | Fluoboric acid/fluosilicic acid 45.5/2.7% solution in water. |

The proportions of the ingredients employed are shown in Table VII. The foams were prepared by adding Mixture B to Mixture A with vigorous stirring. The characteristics of the foams are shown in Table VII.

*Example 15*

A series of foams was made from ingredients prepared as the following two mixtures:

| Mxture A | Mixture B |
|---|---|
| Aldol trimer of 2-formyl-3,4-dihydro-2H-pyran admixed with trichloromonofluoromethane (80/20 by volume), 150 grams. 3,4-dihydro-2H-pyran-2-methyl-(3,4-dihydro-2H-pyran-2-carboxylate) admixed with 2:2-di-p-hydroxyphenyl propane in proportion 4:1, 150 grams. Low molecular weight resinous condensate of epichlorohydrin and 2:2-di-p-hydroxyphenyl propane, as in Table VIII. Diphenylmethane diisocyanate, as in Table VIII. Siloxane oxyalkylene copolymer type silicone surfactant, 2 grams. | Fluoboric acid/fluosilicic acid 45.5/2.7% solution in water or boron trifluoride etherate in polypropylene glycol (1:4), as in Table VIII. Polypropylene glycol of molecular weight 2025, as in Table VIII. Trichloromonofluoromethane, as in Table VIII. |

TABLE VII

| Aldol trimer of 2-formyl-3, 4-dihydro 2H-pyran/trich oromonofluoromethane (grams) | Low molecular weight resinous condensate of epichlorohydrin and 2:2-p-di-hydroxyphenyl propane (grams) | Polypropylene glycol of molecular weight 2025 (grams) | Styrene (grams) | Trichloromono-fluoromethane (cc.) | Fluoboric acid/ fluosilicic acid 45.5/2.7% solution in water (cc.) | Induction time (sec.) | Rise time (sec.) |
|---|---|---|---|---|---|---|---|
| 50 | 10 | 10 | ---- | 25 | 0.6 | 60 | 10 |
| 30 | 10 | 30 | ---- | 25 | 0.7 | 300 | 75 |
| 30 | 10 | 30 | ---- | 25 | 1.0 | 135 | 45 |
| 40 | 10 | 25 | 10 | 25 | 1.0 | 270 | 60 |
| 40 | 10 | 20 | 5 | 25 | 1.2 | 270 | 30 |
| 30 | 10 | 30 | 5 | 25 | 1.2 | 180 | 30 |

Mixture B was added to Mixture A with vigorous stirring. The resulting foams and the proportions of the varying ingredients are shown in Table VIII.

TABLE VIII

| Low molecular weight resinous condensate of epichlorohydrin and 2:2-di-p-hydroxyphenyl-propane (grams) | Diphenylmethane diisocyanate (grams) | Polypropylene glycol of molecular weight 2025 (grams) | Trichloro-monofluoro-methane (cc.) | Fluoboric acid/fluosilicic acid 45.5/2.7% solution in water (cc.) | Boron trifluoride etherate in polypropylene glycol (1:4) (cc.) | Induction time (sec.) | Rise time (sec.) |
|---|---|---|---|---|---|---|---|
| ---- | 15 | 60 | 10 | 1.7 | ---- | 65 | 25 |
| ---- | 15 | 50 | 10 | 1.7 | ---- | 45 | 25 |
| ---- | 15 | 40 | 10 | 1.7 | ---- | 35 | 25 |
| 20 | 15 | 40 | 10 | 1.8 | ---- | 15 | 15 |
| 20 | 15 | 40 | 10 | 1.7 | ---- | 30 | 20 |
| ---- | 15 | 40 | 10 | 1.9 | ---- | 75 | 25 |
| ---- | ---- | 40 | 10 | ---- | 11 | 60 | 25 |
| ---- | ---- | 60 | 10 | ---- | 11 | 60 | 20 |
| 20 | ---- | 40 | 10 | ---- | 10 | 120 | 40 |

Example 16

A series of foams was made from ingredients prepared as the following two mixtures:

| Mixture A | Mixture B |
|---|---|
| Aldol trimer of 2-formyl-3,4-dihydro-2H-pyran admixed with trichloro-monofluoromethane (80/20 by volume). 3,4-dihydro-2H-pyran-2-methyl-(3,4-dihydro-2H-pyran-2-carboxylate) admixed with 2:2-di-p-hydroxyphenyl propane in proportions of 4:1. Low molecular weight resinous condensate of epichlorohydrin and 2:2-di-p-hydroxyphenyl propane. Diphenylmethane diisocyanate. Styrene. | The following ingredient was prepare separately: p-tert. butylphenol-formaldehyde resin, 28 parts. Polypropylene glycol of molecular weight 2025, 5.6 parts. Trichloromonofluoro-methane, 40 parts. Mixture B was then prepared containing— Ingredient above, 37 parts. Polypropylene glycol of molecular weight 2025, 30 parts. Boron trifluoride etherate, 25 parts. |

Mixture B was added to Mixture A with vigorous stirring. The compositions and resulting foams are shown in Table IX.

Example 17

A series of foams was made from ingredients prepared as the following two mixtures:

| Mixture A | Mixture B |
|---|---|
| Aldo trimer of 2-formyl-3,4-dihydro-2H-pyran admixed with trichloro-monofluoro-methane (80/20 by volume). 3,4-dihydro-2H-pyran-2-methyl-(3,4-dihydro-2H-pyran-2-carboxylate) admixed with 2:2-di-p-hydroxyphenyl propane in proportion 4:1. Low molecular weight resinous condensate of epichlorohydrin and 2:2-di-p-hydroxyphenyl propane. Methylated melamine-formaldehyde resin (Vulcafor VDM). | Boron trifluoride etherate. Polypropylene glycol of molecular weight 2025. Trichloromonofluoro-methane. |

TABLE IX

| Aldol trimer of 2-formyl-3,4-dihydro-2H-pyran/trichloro-monofluoromethane (80/20 by volume) (grams) | 3,4-dihydro-2H-pyran-2-methyl-(3,4-dihydro-2H-pyran-2-carboxylate)/2:2-di-p-hydroxyphenyl propane (4:1) (grams) | Low molecular weight resinous condensate of epichlorohydrin and 2:2-di-p-hydroxyphenyl propane (grams) | Diphenylmethane diisocyanate (grams) | Styrene (grams) | Mixture B (cc.) | Boron trifluoride etherate (cc.) | Polypropylene glycol (of molecular weight 2025 (grams) | Trichloromonofluoro-methane (grams) | Induction time (sec.) | Rise time (sec.) |
|---|---|---|---|---|---|---|---|---|---|---|
| 150 | 150 | 20 | ---- | ---- | 11 | ---- | 40 | 10 | 30 | 20 |
| 150 | 150 | 20 | ---- | ---- | 10.5 | ---- | 40 | 10 | 40 | 15 |
| 150 | 150 | 20 | ---- | ---- | 10 | ---- | 40 | 10 | 45 | 30 |
| 150 | 150 | 10 | ---- | ---- | ---- | 2 | 40 | 10 | 205 | 30 |
| 150 | 150 | 10 | ---- | ---- | ---- | 2.3 | 40 | 10 | 65 | 20 |
| 150 | 150 | 10 | ---- | ---- | ---- | 2.4 | 40 | 10 | 45 | 20 |
| 150 | 150 | 10 | 10 | ---- | ---- | 2.4 | 40 | 15 | 30 | 15 |
| 150 | 150 | 10 | 15 | ---- | ---- | 2.4 | 40 | 15 | 35 | 10 |
| 150 | 150 | ---- | 10 | ---- | ---- | 2.4 | 50 | 15 | 50 | 15 |
| 150 | 150 | ---- | 10 | ---- | ---- | 2.4 | 50 | 20 | 60 | 25 |
| 250 | 125 | 10 | ---- | ---- | ---- | 2.6 | 70 | 25 | 45 | 15 |
| 250 | 125 | 10 | ---- | ---- | ---- | 2.8 | 70 | 25 | ---- | ---- |
| 250 | 125 | 10 | ---- | 10 | ---- | 2.8 | 70 | 25 | ---- | ---- |
| 250 | 125 | 10 | ---- | 10 | ---- | 2.8 | 70 | 25 | ---- | ---- |

Mixture B was added to Mixture A with vigorous stirring. The compositions and resulting foams are shown in Table X.

TABLE X

| Aldol trimer of 2-formyl-3,4-dihydro-2H-pyran/trichloromon-fluoromethane (grams) | 3,4-dihydro-2H,pyran-2-methyl-(3,4-dihydro-2H-pyran-2-carboxylate)/2:2-di-p-hydroxyphenyl propane (4:1) (grams) | Low molecular weight resinous condensate of epichlorohydrin and 2:2-di-p-hydroxyphenyl propane (grams) | Methylated melamine formaldehyde resin (Vulcafor VDM) (grams) | Boron trifluoride etherate (cc.) | Polypropylene glycol of molecular weight 2025 (grams) | Trichloromonofluoromethane (cc.) | Induction time (sec.) | Rise time (sec.) | Density (lb./cu. ft.) | Force for 10% and 20% compression parallel to direction of rise (lb./sq.in.) |
|---|---|---|---|---|---|---|---|---|---|---|
| 175 | 175 | 10 | 1   | 2.8 | 60  | 20 | 100 | 20 | ------ | ------------ |
| 175 | 175 | 10 | 1.5 | 3.0 | 60  | 20 | 75  | 20 | ------ | ------------ |
| 175 | 175 | 10 | 3.0 | 3.2 | 60  | 20 | 120 | 30 | ------ | ------------ |
| 200 | 200 | 10 | 3.0 | 3.2 | 60  | 20 | 125 | 35 | ------ | ------------ |
| 200 | 200 | 10 | 3.0 | 3.2 | 60  | 25 | 100 | 30 | ------ | ------------ |
| 200 | 200 | 10 | 3.0 | 3.2 | 60  | 30 | 120 | 20 | ------ | ------------ |
| 400 | 400 | 20 | 6.0 | 6.4 | 120 | 100 | ------ | (²) | ³ 2.28 | { 12.3 (10%)<br>⁵ 16.6 (20%) } |
| 200 | 200 | 10 | ---- | 3.2 | 60  | 40 | 210 | 30 | ------ | ------------ |
| 300 | 300 | 15 | ---- | 3.4 | ¹ 90 | 100 | 45 | 40 | ⁴ 3.7 | ------------ |

¹ Polypropylene glycol of molecular weight 425.
² Contained rise in preheated mould.
³ Core.
⁴ Overall.
⁵ Closed cell content 84.3%.

*Example 18*

A series of foams was made from ingredients prepared as the following two mixtures:

| Mixture A | Mixture B |
|---|---|
| Aldol trimer of 2-formyl-3,4-dihydro-2H-pyran admixed with trichloromonofluoromethane (80/20 by volume).<br>3,4-dihydro-2H-pyran-2-methyl-(3,4-dihydro-2H-pyran-2-carboxylate) admixed with 2:2-di-p-hydroxyphenyl propane in proportions of (4:1).<br>Low molecular weight resinous condensate of epichlorohydrin and 2:2-di-p-hydroxyphenyl propane.<br>Diphenylmethane diisocyanate.<br>Methylated melamine-formaldehyde resin (Vulcafor VDM).<br>10% p-toluenesulphonic acid solution in ethylene glycol. | Boron trifluoride dihydrate.<br>Polypropylene glycol of molecular weight 2025.<br>Trichloromonofluoromethane. |

Mixture B was added to Mixture A with vigorous stirring. The compositions and resulting foams are described in Table XI.

*Example 19*

A series of foams was made from ingredients prepared as the following two mixtures:

| Mixture A | Mixture B |
|---|---|
| Aldol trimer of 2-formyl-3,4-dihydro-2H-pyran admixed with trichloromonofluoromethane (80/20 by volume), 200 grams.<br>3,4-dihydro-2H-pyran-2-methyl-(3,4-dihydro-2H-pyran-2-carboxylate) admixed with 2:2-di-p-hydroxyphenyl propane in proportions (4:1), 100 grams.<br>Low molecular weight resinous condensate of epichlorohydrin and 2:2-di-p-hydroxyphenyl propane, as in Table XII.<br>Diphenylmethane diisocyanate, 10 grams.<br>Siloxane oxyalkylene copolymer type surfactant, 2 grams. | Polypropylene glycol of molecular weight 2025 or 1025, as in Table XII.<br>Fluoboric acid/fluosilicic acid 45.5/2.7% solution in water, as in Table XII.<br>Trichloromonofluoromethane, as in Table XII. |

Mixture B was added to Mixture A with vigorous stir-

TABLE XI

| Aldol trimer of 2-formyl-3,4-dihydro-2H-pyran/trichloromonofluoromethane (grams) | 3,4-dihydro-2H-pyran-2-methyl-(3,4-dihydro-2H-pyran-2-carboxylate) 2:2-di-p-hydroxyphenyl propane (4:1) (grams) | Low molecular weight resinous condensate of epichlorohydrin and 2:2-di-p-hydroxyphenyl propane (grams) | Methylated melamineformaldehyde resin (Vulcafor VDM) (grams) | Diphenylmethane diisocyanate (grams) | 10% p-toluenesulphonic acid in ethylene glycol (cc.) | Boron trifluoride dihydrate (cc.) | Polypropylene glycol of molecular weight 2025 (grams) | Trichloromonofluoromethane (cc.) | Induction time (sec.) | Rise time (sec.) | Density (Overall) lb./cu.ft. |
|---|---|---|---|---|---|---|---|---|---|---|---|
| 200 | 200 | 10 | 2  | ----- | ----- | 3.2 | 60  | 40  | 145 | 60 | ----- |
| 200 | 200 | 10 | -- | ----- | ----- | 1.5 | 60  | 40  | 405 | 60 | ----- |
| 200 | 200 | 10 | -- | ----- | 10    | 1.5 | 60  | 30  | 390 | 60 | ----- |
| 200 | 200 | 10 | -- | ----- | ----- | 1.5 | 40  | 30  | 150 | 45 | ----- |
| 200 | 200 | 10 | -- | 2     | ----- | 1.5 | 60  | 30  | 45  | 45 | ----- |
| 200 | 200 | 10 | -- | ----- | ----- | 1.4 | 60  | 30  | 150 | 60 | ----- |
| 200 | 200 | 10 | -- | ----- | ----- | 2.0 | 60  | 30  | 80  | 50 | ----- |
| 200 | 200 | 20 | -- | ----- | ----- | 2.0 | 70  | 30  | 120 | 60 | ----- |
| 400 | 400 | 20 | -- | ----- | ----- | 4.0 | 120 | 100 | 55  | 45 | *2.5  |

*Preheated mould, contained rise.

ring. The variable ingredients of the composition and the resulting foams are shown in Table XII.

TABLE XII

| Low molecular weight resinous condensate of epichlorohydrin and 2:2-di-p-hydroxyphenyl propane (grams) | Polypropylene glycol of molecular weight 2025 (grams) | Polypropylene glycol of molecular weight 1025 (grams) | Fluoboric acid/fluosilicic acid 45.5/2.7% solution in water (cc.) | Trichloromonofluoromethane (cc.) | Induction time (sec.) | Rise time (sec.) |
|---|---|---|---|---|---|---|
| 40 | 20 | -------- | 1.5 | 30 | 30 | 30 |
| 20 | 40 | -------- | 1.8 | 20 | 90 | 60 |
| 20 | -------- | 40 | 1.8 | 20 | 90 | 55 |
| 20 | 30 | -------- | 1.8 | 20 | 45 | 35 |

*Example 20*

A series of foams was made from ingredients prepared as the following two mixtures:

| Mixture A | Mixture B |
|---|---|
| Aldol trimer of 2-formyl-3,4-dihydro-2H-pyran admixed with trichloro-monofluoromethane (80/20 by volume). 3,4-dihydro-2H-pyran-2-methyl-(3,4-dihydro-2H-pyran-2-carboxylate) admixed with 2:2-di-p-hydroxyphenyl propane in proportions of 4:1. Low molecular weight resinous condensate of epichlorohydrin and 2:2-di-p-hydroxyphenyl propane. Diphenylmethane diisocyanate. Siloxane oxyalkylene copolymer type surfactant. | Polypropylene glycol of molecular weight 1025. Trichloromonofluoromethane. Fluoboric acid/fluosilicic acid, 45.5/2.7% solution in water. Tris (2,3-dibromopropyl)-Phosphate. |

Mixture B was added to Mixture A with vigorous stirring. The burning characteristics of the resulting foams were tested according to A.S.T.M. D-1692-59T. The compositions and characteristics of the foams are described in Table XIII.

*Example 21*

A series of foams was made from ingredients prepared as the following two mixtures:

| Mixture A | Mixture B |
|---|---|
| Aldol trimer of 2-formyl-3,4-dihydro-2H-pyran admixed with trichloromonofluoromethane (80/20 by volume). 3,4-dihydro-2H-pyran-2-methyl-(3,4-dihydro-2H-pyran-2-carboxylate) admixed with 2:2-di-p-hydroxyphenyl propane in the proportions of 4:1. Low molecular weight resinous condensate of epichlorohydrin and 2:2-di-p-hydroxyphenyl propane. Siloxane oxyalkylene copolymer type silicone surfactant. | Polypropylene glycol, molecular weights 425, 1025, 2025. Boron trifluoride etherate or boron trifluoride dihydrate or fluoboric acid/fluosilicic acid 45.5/2.7% solution in water. The boron trifluoride etherate was dissolved in the polypropylene glycol. Trichloromonofluoromethane. |

Mixture B was added to Mixture A with vigorous stirring. The compositions employed and the resulting foams are described in Table XIV.

TABLE XIII

| Aldol trimer of 2-formyl-3,4-dihydro-2H-pyran/trichloromonofluoromethane (80/20) (grams) | 3,4-dihydro-2H-pyran-2-methyl (3,4-dihydro-2H-pyran-2-carboxylate)/2:2-di-p-hydroxyphenyl propane (4:1) (grams) | Low M.W. condensate of epichlorohydrin and 2:2-di-p-hydroxyphenyl propane (grams) | Diphenylmethane diisocyanate (grams) | Siloxane oxyalkylene copolymer type surfactant (cc.) | Polypropylene glycol of molecular weight 1025 (grams) | Trichloromonofluoromethane (cc.) | Fluoboric acid/fluosilicic acid 45.5/2.7% solution in water (cc.) | Tris (2,3-dibromopropyl) phosphate (grams) | Induction time (sec.) | Rise time (sec.) | Density (core) (lb./cu. ft.) | Density (overall) (lb./cu. ft.) | Test A.S.T.M.-D-1692-59T |
|---|---|---|---|---|---|---|---|---|---|---|---|---|---|
| 200 | 50 | 20 | 10 | 2 | 30 | 20 | 1.8 | 50 | 15 | 45 | ------ | ------ | Non-burning. |
| 200 | 100 | 20 | 10 | 2 | 30 | 20 | 1.8 | 30 | 120 | 75 | ------ | ------ | Burning. |
| 200 | 100 | 20 | 10 | 2 | 30 | 20 | 1.8 | 50 | 45 | 55 | ------ | ------ | Non-burning. |
| 200 | 100 | 30 | 10 | 2 | ------ | 20 | 1.8 | 50 | 10 | 40 | ------ | ------ | Do. |
| 200 | 100 | 30 | 10 | 2 | 30 | 20 | 1.8 | 40 | 100 | 50 | ------ | ------ | Self-extinguishing. |
| 200 | 100 | 30 | ------ | 2 | 30 | 80 | 1.8 | 40 | 60 | 135 | ------ | [3] 2.28 | Non-burning. |
| 200 | 100 | 40 | ------ | 2 | 20 | 80 | 2.0 | 40 | 45 | 75 | 1.2 | 2.28 | Do. |
| 200 | 100 | 80 | ------ | 2 | 20 | 80 | 2.4 | 40 | 30 | 35 | 1.7 | 2.4 | Do. |
| 15 | ------ | ------ | ------ | ------ | ------ | 3 | [1] 0.8 | 5 | ([2]) | ------ | ------ | ------ | Do. |
| 10 | ------ | ------ | ------ | 5 | ------ | 3 | [1] 0.8 | 5 | 5 | 20 | ------ | ------ | Do. |

[1] The fluoboric acid/fluosilicic acid catalyst was replaced by boron trifluoride etherate in polypropylene glycol.
[2] Instant.
[3] Preheated mould.

TABLE XIV

| Aldol trimer of 2-formyl-3,4-dihydro-2H-pyran/trichloro-monofluoromethane (80/20 by volume) (grams) | 3,4-dihydro-2H-pyran-2-methyl-(3,4-dihydro-2H-pyran-2-carboxylate)/2:2-di-p-hydroxyphenyl propane (4:1) (grams) | Low MW resinous condensate of epichlorohydrin and 2:2-di-p-hydroxyphenyl propane (grams) | Polypropylene glycol molecular weight 425 (grams) | Polypropylene glycol molecular weight 1025 (grams) | Polypropylene glycol molecular weight 2025 (grams) | Trichloromonofluoromethane (cc.) | Boron trifluoride etherate (cc.) | Boron trifluoride dihydrate (cc.) | Fluoboric acid/fluosilicic acid 45.5/2.7% solution in water (cc.) | Siloxane oxyalkylene copolymer type surfactant (grams) | Induction time (sec.) | Rise time (sec.) | Density (core) (lb./cu. ft.) | Density (overall) (lb./cu. ft.) |
|---|---|---|---|---|---|---|---|---|---|---|---|---|---|---|
| 150 | 150 | 40 | ------ | ------ | 60 | 60 | 2.0 | ------ | ------ | 2 | 105 | 75 | ------ | ------ |
| 150 | 150 | 40 | ------ | ------ | ------ | 60 | 2.8 | ------ | ------ | 2 | 30 | 30 | 1.75 | 2.28 |
| 150 | 150 | 40 | ------ | 60 | ------ | 60 | ------ | 2.0 | ------ | 2 | 180 | ------ | ------ | ------ |
| 150 | 150 | 40 | ------ | ------ | 60 | 60 | ------ | ------ | 2.2 | 2 | 150 | ------ | ------ | ------ |
| 150 | 150 | ------ | ------ | ------ | ------ | ------ | ------ | ------ | ------ | 2 | 45 | 45 | ------ | ------ |
| 150 | 150 | 20 | ------ | ------ | 60 | 80 | 2.6 | ------ | ------ | 2 | 50 | 40 | (*) | ------ |
| 300 | 300 | 15 | 90 | ------ | ------ | 100 | 3.4 | ------ | ------ | 2 | 50 | 60 | ------ | ------ |

*Preheated mould.

Example 22

A series of foams was made from ingredients prepared as the following two mixtures:

| Mixture A | Mixture B |
|---|---|
| Aldol trimer of 2-formyl- 3, 4-dihydro-2H-pyran admixed with trichloro-monofluoromethane (80/20 by volume). 3, 4-dihydro-2H-pyran-2-methyl-(3, 4-dihydro-2H-pyran-2-carboxylate) admixed with 2:2-di-p-hydroxyphenyl propane in the proportions 4:1. Low molecular weight resinous condensate of epichlorohydrin and 2:2-di-p-hydroxyphenyl propane. Siloxane oxyalkylene copolymer type silicone surfactant. | Polypropylene glycol, molecular weights 150, 425, 1025, 2025. Trichloromono-fluoromethane. Boron trifluoride etherate, dissolved in the polypropylene glycol ingredient. |

Mixture B was added to Mixture A with vigorous stirring. The compositions employed and the resulting foams are described in Table XV.

Example 23

A series of foams was made from ingredients prepared as the following two mixtures:

| Mixture A | Mixture B |
|---|---|
| Aldol trimer of 2-formyl-3,4-dihydro-2H-pyran admixed with trichloromonofluoromethane (80/20 by volume), 1.25 parts. 3,4-dihydro-2H-pyran-2-methyl-(3,4-dihydro-2H-pyran-2-carboxylate), 1.0 part. 2:2-di-p-hydroxyphenyl propane, 0.25 part. Low molecular weight resinous condensate of epichlorohydrin and 2:2-di-p-hydroxyphenyl propane, 0.025 part. Siloxane oxyalkylene copolymer type silicone surfactant, 0.016 part. | Polypropylene glycol of molecular weight 425. Boron trifluoride etherate, dissolved in polypropylene glycol ingredient. Trichloromonofluoromethane. |

Additional silicon surfactants (as indicated in Table XVI) were added to Mixture A. Mixture B was then added to Mixture A with vigorous stirring. The compo-

TABLE XV

| Aldol trimer of 2-formyl-3,4-dihydro-2H-pyran/trichloromonofluoromethane (80/20 by volume) (grams) | 3,4-dihydro-2H-pyran-2-methyl-(3,4-dihydro-2H-pyran-2-carboxylate)/2:2-di-p-hydroxyphenyl propane (4:1) (grams) | Low MW resinous condensate of epichlorohydrin and 2:2-di-p-hydroxyphenyl propane (grams) | Polypropylene glycol of molecular weight 150 (grams) | Polypropylene glycol of molecular weight 425 (grams) | Polypropylene glycol of molecular weight 1025 (grams) | Polypropylene glycol of molecular weight 2025 (grams) | Trichloromonofluoromethane (cc.) | Boron trifluoride etherate (cc.) | Siloxane oxyalkylene copolymer type surfactant (grams) | Induction time (sec.) | Rise time (sec.) | Density (core) (lb./cu. ft.) | Density (overall) (lb./cu. ft.) |
|---|---|---|---|---|---|---|---|---|---|---|---|---|---|
| 170 | 170 | 10 | ---- | ---- | ---- | 50 | 40 | 2.2 | 2 | 45 | 30 | 1.50 | 1.97 |
| 200 | 200 | 12 | ---- | ---- | 60 | 40 | ---- | 2.5 | 2 | 90 | 40 | 1.5 | 2.4 |
| 200 | 200 | 12 | ---- | 60 | ---- | ---- | 40 | 2.5 | 2 | 120 | 40 | 1.66 | 2.38 |
| 200 | 200 | 12 | 60 | ---- | ---- | ---- | 40 | 2.5 | 2 | 180 | 60 | ---- | 2.35 |
| 200 | 200 | 12 | ---- | ---- | ---- | 50 | 40 | 2.5 | ---- | 60 | 90 | 1.62 | 2.30 |
| 200 | 200 | 12 | ---- | ---- | 50 | ---- | 40 | 2.5 | ---- | 45 | 35 | 1.62 | 2.30 |
| 200 | 200 | 12 | ---- | 50 | ---- | ---- | 40 | ---- | ---- | 60 | 35 | 1.54 | 2.32 | sitions employed and the resulting foams are described in Table XVI.

TABLE XVI

| Mixture A (grams) | Additional silicone surfactant (grams) | Boron trifluoride etherate (cc.) | Polypropylene glycol MW 425 (grams) | Trichloro-monofluoro-methane (cc.) | Induction time (sec.) | Rise time (sec.) | Density (Core) (lb./cu. ft.) | Density (overall) (lb./cu. ft.) |
|---|---|---|---|---|---|---|---|---|
| 415 | (L-520) 2 | 2.5 | 50 | 30 | 75 | 30 | 1.43 | 2.3 |
| 412 | (L-530) 2 | 2.5 | 70 | 25 | 60 | 35 | 1.80 | 2.35 |
| 412 | (L-531) 2 | 2.5 | 70 | 25 | 50 | 30 | 1.80 | 2.35 |
| 412 | (L-531) 2 | 2.5 | 60 | 25 | 45 | 30 | 1.80 | 2.3 |

The moulds were preheated.

Example 24

A series of foams was made from ingredients prepared as the following two mixtures:

| Mixture A | Mixture B |
|---|---|
| Aldol trimer of 2-formyl-3,4-dihydro-2H-pyran admixed with trichloromonofluoromethane (80/20 by volume). 3,4-dihydro-2H-pyran-2-methyl-(3,4-dihydro-2H-pyran-2-carboxylate) admixed with 2:2-di-p-hydroxyphenyl propane in proportions 4:1. Low molecular weight resinous condensate of epichlorohydrin and 2:2-di-p-hydroxyphenyl propane. Silicone surfactant Dow 199 or Dow 201. Diphenylmethane diisocyanate. | Polypropylene glycol of molecular weight 425. Fluoboric acid/fluosilicic acid 45.5/2.7% solution in water or Borontrifluoride etherate dissolved in the polypropylene glycol ingredient. Trichloromonofluoromethane. |

Mixture B was added to Mixture A with vigorous stirring. The compositons employed and the resulting foams are described in Table XVII.

Example 25

A series of foams was made from ingredients prepared as the following two mixtures:

| Mixture A | Mixture B |
|---|---|
| Aldol trimer of 2-formyl-3,4-dihydro-2H-pyran admixed with trichloromonofluoromethane (80/20 by volume). 3,4-dihydro-2H-pyran-2-methyl-(3,4-dihydro-2H-pyran-2-carboxylate) admixed with 2:2-di-p-hydroxyphenyl propane in proportions of 4:1. Silicone surfactant Dow 201. | Boron trifluoride etherate or Boron trifluoride dihydrate, the boron trifluoride etherate being dissolved in the polypropylene glycol ingredient. Trichloromonofluoromethane. Polypropylene glycol of molecular weight 425. 10% p-toluenesulphonic acid in ethylene glycol solution. |

Mixture B was added to Mixture A with vigorous stirring. The compositions employed and the resulting foams are described in Table XVIII.

TABLE XVII

| Aldol trimer of 2-formyl-3,4-dihydro-2H-pyran/trichloromonofluoromethane (80/20 by volume) grams | 3,4-dihydro-2H-pyran-2-methyl-(3,4-dihydro-2H-pyran-2-carboxylate)/2:2-di-p-hydroxyphenyl propane (4:1) grams | Low MW condensate of epichlorohydrin and 2:2-di-p-hydroxyphenyl propane (grams) | Silicone surfactant Dow 199 (grams) | Surfactant Dow 201 (grams) | Diphenylmethane diisocyanate (grams) | Polypropylene glycol molecular weight 425 (grams) | Fluoboric acid/fluosilicic acid 45.5/2.7% solution in water (cc.) | Boron trifluoride etherate (cc.) | Trichloromonofluoromethane (cc.) | Induction time (sec.) | Rise time (sec.) |
|---|---|---|---|---|---|---|---|---|---|---|---|
| 200 | 200 | 12 | -------- | 4 | -------- | 60 | -------- | 2.5 | 30 | 20 | 30 |
| 200 | 200 | 12 | -------- | 3 | -------- | 60 | -------- | 2.2 | 30 | ---- | ---- |
| 200 | 200 | 12 | -------- | -------- | -------- | 60 | -------- | 2.2 | 30 | 45 | 45 |
| 200 | 200 | 12 | 3 | -------- | -------- | 60 | 2.2 | -------- | 30 | 75 | *50 |
| 200 | 200 | 12 | -------- | 3 | 10 | 60 | 2.3 | -------- | 30 | 55 | *50 |
| 200 | 200 | 12 | -------- | 3 | 10 | 60 | 2.6 | -------- | 30 | ---- | ---- |

*Preheated moulds.

TABLE XVIII

| Aldol trimer of 2-formyl-3,4-dihydro-2H-pyran/trichloromonofluoromethane (80/20 by volume) (grams) | 3,4-dihydro-2H-pyran-2-methyl-(3,4:dihydro-2H-pyran-2-carboxylate)/2:2-di-p-hydroxyphenyl propane (4:1) (grams) | Silicone surfactant Dow 201 (grams) | Trichloromonofluoromethane (cc.) | Polypropylene glycol molecular weight 425 (grams) | Boron trifluoride etherate (cc.) | Boron trifluoride dihydrate (cc.) | 10% p-toluenesulphonic acid in ethylene glycol (cc.) | Induction time (sec.) | Rise time (sec.) | Density (overall) (lb./cu. ft.) |
|---|---|---|---|---|---|---|---|---|---|---|
| 200 | 200 | 2 | 30 | 60 | 2 | -------- | -------- | 60 | 60 | *2.2 |
| 200 | 200 | 4 | 80 | 55 | 2.2 | -------- | -------- | 40 | 60 | *2.2 |
| 220 | 220 | 4 | 25 | 60 | 2.2 | -------- | -------- | 40 | 50 | *2.5 |
| 220 | 220 | 4 | 25 | 60 | 2.2 | -------- | -------- | 40 | 35 | -------- |
| 220 | 220 | 2 | 30 | 60 | -------- | 1.5 | 1.5 | 45 | 30 | -------- |

*Heated moulds.

Example 26

A series of foams was made from ingredients prepared as the following two mixtures:

| Mixture A | Mixture B |
|---|---|
| Aldol trimer of 2-formyl-3,4-dihydro-2H-pyran admixed with trichloromonofluoromethane (80/20 by volume). 3,4-dihydro-2H-pyran-2-methyl-(3,4-dihydro-2H-pyran-2-carboxylate) admixed with 2:2-di-p-hydroxyphenyl propane in proportions of 4:1. Diphenylmethane diisocyanate. Silicone surfactant Dow 201. | Boron trifluoride etherate, dissolved in the polypropylene glycol ingredient. Polypropylene glycol of molecular weight 425. Trichloromonofluoromethane. |

Example 27

A series of foams was made from ingredients prepared as the following two mixtures:

| Mixture A | Mixture B (proportions variable) |
|---|---|
| Aldol trimer of 2-formyl-3,4-dihydro-2H-pyran admixed with trichloromonofluoromethane (80/20 by volume), 50 parts. 3,4-dihydro-2H-pyran-2-methyl-(3,4-dihydro-2H-pyran-2-carboxylate) admixed with 2:2-di-p-hydroxyphenyl propane in proportions of 4:1, 50 parts. Diphenylmethane diisocyanate, 3 parts. | Polypropylene glycol of molecular weight 425. Trichloromonofluoromethane. Castor oil. Boron trifluoride etherate, dissolve in the polypropylene glycol and castor oil ingredients. Dibutyltin dilaurate. |

TABLE XIX

| Aldol trimer of 2-formyl-3,4-dihydro-2H-pyran/trichloromonofluoromethane (80/20 by volume) (grams) | 3,4-dihydro-2H-pyran-2-methyl-(3,4-dihydro-2H-pyran-2-carboxylate)/2:2-di-p-hydroxyphenyl propane (4:1) (grams) | Diphenyl methane diisocyanate (grams) | Silicone surfactant Dow 201 (grams) | Polypropylene glycol molecular weight 425 (grams) | Trichloromonofluoromethane (cc.) | Boron trifluoride etherate (cc.) | Induction time (sec.) | Rise time (sec.) | Density (core) (lb./cu. ft.) | Density (overall) (lb./cu. ft.) |
|---|---|---|---|---|---|---|---|---|---|---|
| 175 | 175 | 13 | 1 | 53 | 80 | 2.4 | 70 | 60 | -------- | 2.32 |
| *175 | 175 | 13 | 1 | 53 | 80 | 2.6 | 55 | 45 | -------- | -------- |
| *175 | 175 | 15 | 1 | 60 | 80 | 3.0 | 30 | 35 | -------- | -------- |
| 200 | 200 | 15 | 1 | 60 | 50 | 2.8 | 30 | 35 | 1.8 | 2.3 |

THE LAST FOAM ABOVE HAD THE ADDITIONAL CHARACTERISTICS

Force required for 10% compression:
Parallel to direction of rise 11.6 lb./sq. in.
Perpendicular direction of rise 8.4 lb./sq. in.
Force required for 20% compression.
Parallel to direction of rise 11.5 lb./sq. in.
Perpendicular direction of rise 8.75 lb./sq. in.
K factor 0.146.
*Heated moulds.

DIMENSIONAL STABILITY

| Temperature | 24 hours, percent | 7 days, percent | 28 days, percent |
|---|---|---|---|
| −25° C. | −19.5 | −13.2 | +3.35 |
| Room | +0.7 | +1.6 | +4.88 |
| 100° C. | +14.1 | +18.05 | +19.2 |
| 70° C. at 100% R.H. | +17.9 | +3.2 | −25.21 |

Mixture B was added to Mixture A with vigorous stirring. The compositions employed and the resulting foams are described in Table XIX.

To mixture A was added a silicone surfactant and then Mixture B with vigorous stirring. The compositions and resulting foams are described in Table XX.

TABLE XX

| Mixture A (grams) | Silicone surfactant Dow 201 (grams) | Silicone surfactant L-520 (grams) | Polypropylene glycol of molecular weight 425 (grams) | Trichloromonofluoromethane (cc.) | Boron trifluoride etherate (cc.) | Dibutyltin dilaurate (cc.) | Castor oil (grams) | Induction time (sec.) | Rise time (sec.) | Density (core) (lb./cu. ft.) | Density (overall) (lb./cu. ft.) |
|---|---|---|---|---|---|---|---|---|---|---|---|
| ¹415 | -------- | 2 | 60 | 80 | 3 | -------- | -------- | 75 | 60 | -------- | -------- |
| 415 | 1 | -------- | 60 | 20 | 2.8 | -------- | -------- | 135 | 60 | -------- | -------- |
| 415 | 1 | -------- | 60 | 20 | 3.0 | -------- | -------- | 30 | 35 | -------- | -------- |
| 415 | 1 | -------- | 60 | 20 | 2.9 | -------- | -------- | 35 | 40 | -------- | -------- |
| 415 | 1 | -------- | 60 | 50 | 3.2 | -------- | -------- | 20 | 40 | 1.59  1.67 | ²2.32 |
| 415 | 1 | -------- | 60 | 50 | 4.0 | 2 | -------- | 60 | 45 | -------- | -------- |
| 415 | 1 | -------- | 60 | 50 | 4.3 | 2 | -------- | 20 | 30 | -------- | -------- |
| 415 | 1 | -------- | 60 | 50 | 4.3 | 2.5 | -------- | 35 | 30 | -------- | -------- |
| 415 | 1 | -------- | -------- | 50 | 2.8 | -------- | 60 | Instant | 20 | -------- | 2.35 |
| 415 | 1 | -------- | 60 | 50 | 2.7 | -------- | 60 | 5 | 20 | -------- | -------- |
| 415 | 1 | -------- | 50 | 50 | 2.6 | -------- | -------- | 10 | 20 | 1.50 | 2.35 |

¹ Preheated mould.
² Force required for 10% compression.
Parallel to direction of rise, 13.2 lb./sq. in.
Perpendicular direction of rise. 5.75 lb./sq. in.
Force required for 20% compression.
Parallel to direction of rise, 13.6 lb./sq. in.
Perpendicular direction of rise, 6.99 lb./sq. in.
Closed cell content, 69.5%.

NOTE.—The first foam in Table XXI was maintained in boiling water. After 2 days shrinkage was observed. After 7 days the foam was partly water logged. After 10 days discoloration and shrinkage had taken place.

Example 28

A series of foams was made from ingredients prepared as the following two mixtures:

| Mixture A | Mixture B (proportions variable) |
|---|---|
| Aldol trimer of 2-formyl-3,4-dihydro-2H-pyran admixed with trichloromonofluoromethane (80/20 by volume), 50 parts. 3,4-dihydro-2H-pyran-2-methyl-(3,4-dihydro-2H-pyran-2-carboxylate) admixed with 2:2-di-p-hydroxyphenyl propane in proportions of 4:1, 50 parts. Diphenylmethane diisocyanate, 3 parts. | Boron trifluoride etherate dissolved in the castor oil and polypropylene glycol ingredients. Castor oil. Polypropylene glycol of molecular weight 425. Methylated melamine formaldehyde resin (Vulcafor VDM). Trichloromonofluoromethane. |

To Mixture A was added a silicone surfactant and then Mixture B with vigorous stirring. The compositions and resulting foams are described in Table XXI.

TABLE XXI

| Mixture A (grams) | Silicone surfactant Dow 201 (grams) | Castor oil (grams) | Polypropylene glycol of molecular weight 425 (grams) | Trichloromono-fluoro-methane (cc.) | Boron trifluoride etherate (cc.) | Methylated melamine formaldehyde resin (Vulcafor VDM) (cc.) | Induction time (sec.) | Rise time (sec.) | Tackfree time (sec.) | Density (core) (lb./cu. ft.) | Density (overall) (lb./cu. ft.) |
|---|---|---|---|---|---|---|---|---|---|---|---|
| 415 | 1 | 40 | ---------- | 40 | 2.4 | ---------- | 15 | 40 | ------ | -------- | -------- |
| 415 | 1 | 30 | ---------- | 40 | 2.2 | ---------- | 10 | 35 | ------ | -------- | -------- |
| 415 | 1 | 30 | ---------- | 40 | 2.4 | ---------- | 7 | 35 | ------ | -------- | -------- |
| 415 | 1 | 30 | 10 | 40 | 2.6 | ---------- | 20 | 35 | 60 | -------- | -------- |
| 415 | 1 | 40 | 10 | 40 | 2.8 | ---------- | 15 | 30 | 60 | -------- | -------- |
| 415 | 1 | 50 | 10 | 40 | 3.0 | ---------- | 5 | 20 | 30 | -------- | -------- |
| 415 | 1 | 50 | 5 | 40 | 3.0 | ---------- | 6 | 20 | ------ | 1.71 | 2.30 |
| 415 | 1 | 50 | 5 | 40 | 3.0 | ---------- | 4 | 20 | ------ | -------- | -------- |
| 415 | 1 | 50 | ---------- | 40 | 3.0 | 1 | 5 | 25 | 60 | -------- | -------- |
| 415 | 1 | 50 | ---------- | 40 | 3.0 | 2 | 20 | 35 | ------ | -------- | -------- |
| 415 | 1 | 50 | ---------- | 40 | 3.0 | 1.5 | 25 | 35 | ------ | -------- | -------- |
| 415 | 4 | 50 | ---------- | 40 | 3.0 | ---------- | 4 | 20 | ------ | -------- | -------- |
| 415 | 4 | 50 | ---------- | 30 | 2.8 | ---------- | 4 | 20 | ------ | -------- | 2.12 |
| 415 | 4 | 50 | ---------- | 30 | 2.6 | ---------- | 10 | 20 | ------ | -------- | 2.12 |
| 415 | 1 | 60 | ---------- | 80 | 3.0 | ---------- | 7 | 10 | ------ | -------- | -------- |
| 415 | 1 | 60 | ---------- | 60 | 2.8 | ---------- | 15 | 10 | ------ | -------- | -------- |
| [1] 415 | 1 | 60 | ---------- | 30 | 2.4 | ---------- | 15 | 15 | ------ | -------- | -------- |
| [1] 415 | 1 | 70 | ---------- | 30 | 2.4 | ---------- | 10 | 15 | ------ | -------- | [2] 2.30 |

[1] Diphenylmethane diisocyanate omitted.  [2] Heated mould.

*Example 29*

A series of foams was made from ingredients prepared as the following two mixtures:

| Mixture A | Mixture B |
|---|---|
| Aldol trimer of 2-formyl-3,4-dihydro-2H-pyran admixed with trichloromonofluoromethane (80/20 by volume). 3,4-dihydro-2H-pyran-2-methyl-(3,4-dihydro-2H-pyran-2-carboxylate) admixed with 2:2-di-p-hydroxyphenyl propane in proportions of 4:1. Diphenylmethane diisocyanate. Silicone surfactant Dow 201. | Polyol (glycerol, LK 380, LHT 112, LG 56, LA 700, LG 168).* Castor oil. Trichloromonofluoromethane. Boron trifluoride etherate dissolved in the polyol ingredient. Dibutyltin dilaurate. |

* LK 380—Polyether alcohol of molecular weight 440. LHT 112—Polyether alcohol of molecular weight 1500. LG 56—Polyether alcohol of molecular weight 2800. LA 700—Polyether alcohol of molecular weight 393. LG 168—Polyether alcohol of molecular weight 1000.

Mixture B was added to Mixture A with vigorous stirring. The compositions and resulting foams are described in Table XXII.

*Example 30*

A series of foams was made from ingredients prepared as the following two mixtures:

| Mixture A | Mixture B |
|---|---|
| Aldol trimer of 2-formyl-3,4-dihydro-2H-pyran admixed with trichloromono-fluoromethane (80/20 by volume). 3,4-dihydro-2H-pyran-2-methyl-(3,4-dihydro-2H-pyran-2-carboxylate) admixed with 2:2-di-p-hydroxyphenyl propane in proportions of 4:1. Diphenylmethane diisocyanate. Silicone surfactant Dow 201. | Polyol (LK-380, LHT-240, Hexol-490, PEP-450). Castor oil. Trichloromonofluoromethane. Boron trifluoride etherate, dissolved in polyol ingredient: LK-380 Polyether alcohol of molecular weight 440. LHT-240 Polyether alcohol of molecular weight 700. Hexol-490 Polypropoxylated hexahydroxy sugar alcohol of molecular weight 700. PeP-450 Polypropoxylated pentaerythritol of molecular weight 400. |

Mixture B was added to Mixture A with vigorous stirring. The compositions and resulting foams are described in Table XXIII.

TABLE XXII

| Aldol trimer of 2-formyl-3,4-dihydro-2H-pyran/trichloromono-fluoromethane (80/20 by volume) (grams) | 3,4-dihydro-2H-pyran-2-methyl-(3,4-dihydro-2H-pyran-2-carboxylate)/2:2-di-p-hydroxyphenyl propane (4:1) (grams) | Diphenylmethane diisocyanate (grams) | Silicone surfactant Dow 201 (grams) | Castor oil (grams) | Polyol (grams) | Trichloromonofluoromethane (cc.) | Boron trifluoride etherate (cc.) | Tributyltin dilaurate (cc.) | Induction time (sec.) | Rise time (sec.) | Tackfree time (sec.) | Density (core) (lb./cu. ft.) | Density (overall) (lb./cu. ft.) |
|---|---|---|---|---|---|---|---|---|---|---|---|---|---|
| 200 | 200 | -------- | 1 | ---- | 60(glycerol) | 30 | 3.0 | ---- | 5 | 6 | ---- | ------ | ------ |
| 200 | 200 | -------- | 1 | ---- | 60(LK-380) | 60 | 3.0 | ---- | 45 | 60 | 60 | ------ | ------ |
| 200 | 200 | -------- | 1 | ---- | 60(LHT-112) | 30 | 3.0 | ---- | 60 | 30 | ---- | ------ | ------ |
| 200 | 200 | -------- | 1 | ---- | 60(LHT-112) | 20 | 2.6 | ---- | 30 | 25 | ---- | ------ | ------ |
| 200 | 200 | -------- | 1 | ---- | 60(LHT-112) | 20 | 2.2 | ---- | 80 | 55 | ---- | ------ | ------ |
| 200 | 200 | -------- | 1 | ---- | 60(LG-56) | 20 | 2.2 | ---- | 85 | 35 | ---- | ------ | ------ |
| 200 | 200 | -------- | 1 | 30 | 30(LG-56) | 20 | 2.2 | ---- | 80 | 30 | ---- | ------ | ------ |
| 200 | 200 | -------- | 1 | 30 | 30(LK-380) | 20 | 2.2 | ---- | 15 | [1] 30 | ---- | ------ | ------ |
| 220 | 220 | -------- | 1 | 30 | 30(LK-380) | 30 | 2.4 | ---- | 20 | 30 | ---- | 2.0 | 2.38 |
| 220 | 220 | 22 | 1 | 30 | 30(LK-380) | 20 | 2.8 | ---- | 15 | 45 | ---- | [2] 1.9 | 2.38 |
| 220 | 220 | -------- | 1 | ---- | 60(LA-700) | 20 | 2.4 | ---- | ---- | ---- | ---- | ------ | ------ |
| 220 | 220 | -------- | 1 | ---- | 60(LKB-168) | 20 | 2.4 | ---- | 150 | 40 | ---- | ------ | ------ |
| 220 | 220 | -------- | 1 | ---- | 60(LKB-168) | 20 | 2.6 | ---- | 35 | 25 | ---- | ------ | ------ |
| 220 | 220 | 22 | 1 | ---- | 60(LKB-168) | 20 | 3.0 | ---- | 45 | 45 | ---- | ------ | ------ |
| 220 | 220 | 20 | 1 | ---- | 50(LKB-168) | 20 | 3.0 | ---- | 30 | 30 | ---- | ------ | ------ |
| 220 | 220 | 20 | 1 | ---- | 50(LKB-168) | 20 | 3.5 | 2 | 15 | 25 | 60 | ------ | ------ |
| 220 | 220 | 20 | 1 | ---- | 50(LKB-168) | 20 | 3.4 | 2 | 30 | 35 | ---- | ------ | [3] 2.28 |

[1] ¾ inch cube immersed in boiling water under reflux for 1 week showed no change in shape but lost 16.6% in weight. The resulting pH of the water solution was 4.5.
[2] After immersion in boiling water under reflux for 1 week there was no change in shape but a loss of 13.4% in weight occurred. The pH of the solution at termination of test was 6.1.
[3] After immersion in boiling water under reflux for 1 week there was no change in shape or structure.

TABLE XXIII

| Aldol trimer of 2-formyl-3,4-dihydro-2H-pyran/ trichloromonofluoro-methane (80/20 by volume) (grams) | 3,4-dihydro-2H-pyran-2-methyl-(3,4-dihydro-2H-pyran-2-carboxylate)/ 2:2-di-p-hydroxyphenyl propane (4:1) (grams) | Diphenylmethane diisocyanate (grams) | Silicone surfactant Dow 201 (grams) | Polyol (grams) | Castor oil (grams) | Trichloromonofluoro-methane (cc.) | Boron trifluoride etherate (cc.) | Induction time (sec.) | Rise time (sec.) | Tackfree time (sec.) | Density (core) (lb./cu. ft.) | Density (overall) (lb./cu. ft.) |
|---|---|---|---|---|---|---|---|---|---|---|---|---|
| 214 | 214 | 13 | 1 | 30(LK-380) | 30 | 20 | 3.5 | 10 | 25 | 30 | | |
| 214 | 214 | 13 | 1 | 30 | 30 | 20 | 3.5 | Instant | 30 | | | |
| 214 | 214 | 13 | | 30 | 30 | 20 | 3.0 | 25 | 40 | | | |
| 220 | 220 | 20 | | 30 | 30 | 20 | 3.0 | 15 | 25 | | | |
| 220 | 220 | 20 | 1 | 30 | 30 | 20 | 3.0 | 15 | 25 | 30 | | 2.34 |
| 220 | 220 | 20 | 2 | 30 | 30 | 20 | 2.8 | 15 | 35 | | | |
| 220 | 220 | 22 | 1.5 | 60(LHT-240) | | 10 | 3.0 | 90 | 45 | | | |
| 220 | 220 | 22 | 1.5 | 40 | 20 | 10 | 2.8 | 70 | 50 | | | |
| 220 | 220 | 22 | 1.5 | 40 | 20 | 20 | 3.0 | 40 | 55 | | | |
| 220 | 220 | 22 | 1.5 | 30 | 30 | 15 | 3.0 | 30 | 55 | | | |
| 200 | 200 | 20 | 1.5 | 80 | | 15 | 3.2 | 35 | 55 | | | |
| 200 | 200 | 20 | 1.5 | 40 | 40 | 15 | 2.8 | 35 | 45 | | | |
| 220 | 220 | 22 | 1.5 | 30(Hexol-490) | 20 | 20 | 3.2 | 30 | 35 | | | |
| 220 | 220 | 22 | 1.5 | 40 | 20 | 20 | 3.2 | 20 | 40 | | | |
| 220 | 220 | 22 | 1.5 | 30 | 20 | 25 | 3.2 | 30 | 35 | | | 2.38 |
| 220 | 220 | 22 | 1.5 | 60(PEP-450) | | 15 | 3.0 | 90 | 95 | | | |
| 220 | 220 | 22 | 2.0 | 30 | 30 | 15 | 2.8 | 15 | 50 | | | |

*Example 31*

A series of foams was made from ingredients prepared as the following two mixtures:

| Mixture A | Mixture B |
|---|---|
| Aldol trimer of 2-formyl-3,4-dihydro-2H-pyran admixed with trichloromonofluoromethane (80/20 by volume). 3,4-dihydro-2H-pyran-2-methyl-(3,4-dihydro-2H-pyran-2-carboxylate) admixed with tetrachlorodiglyceryl phthalate. Diphenylmethane diisocyanate. Silicone surfactant (Dow 201 or Union Carbide L-531). | Castor Oil. Polyol (LG-56, LK-380).* Trichloromonofluoromethane. Boron trifluoride etherate, dissolved in polyol ingredient. |

*LG-56—Polyether alcohol of molecular weight 2800. LK-380—Polyether alcohol of molecular weight 440.

Mixture B was added to Mixture A with vigorous stirring. The compositions and resulting foams are described in Table XXIV.

*Example 32*

A series of foams was made from ingredients prepared as the following two mixtures:

| Mixture A | Mixture B |
|---|---|
| Aldol trimer of 2-formyl-3,4-dihydro-2H-pyran admixed with trichloromonofluoromethane (80/20 by volume). 3,4-dihydro-2H-pyran-2-methyl-(3,4-dihydro-2H-pyran-2-carboxylate) admixed with one of the following ingredients: diglyceryl phthalate, diallyl phthalate, dimethyl phthalate, and low molecular weight resinous condensate of epichlorohydrin and 2:2-di-p-hydroxyphenyl propane (Epon 828 and Eponite 100). Diphenylmethane diisocyanate. Silicone surfactant (Dow 201). | Castor oil. Polyol (LG-168, PeP-450).* Trichloromonofluoromethane. Boron trifluoride etherate, dissolved in the polyol ingredient. |

*LG-168—Polyether alcohol of molecular weight 1000. PeP-450—Polypropoxylated pentaerythritol of molecular weight 400.

TABLE XXIV

| Aldol trimer of 2-formyl-3,4-dihydro-2H-pyran/trichloro-monofluoromethane (80/20 by volume) (grams) | 3,4-dihydro-2H-pyran-2-methyl-(3,4-dihydro-2H-pyran-2-carboxylato)/tetrachlorodi-glyceryl phthalate (grams) | Diphenylmethane diisocyanate (grams) | Silicone surfactant (grams) | Castor oil (grams) | Boron trifluoride etherate (cc.) | Trichloromono-fluoromethane (cc.) | Polyol (grams) | Induction time (sec.) | Rise time (sec.) | Tackfree time (sec.) | Density (core) (lb./cu. ft.) | Density (overall) (lb./cu. ft.) |
|---|---|---|---|---|---|---|---|---|---|---|---|---|
| 200 | 160/40 | | 1 (Dow 201) | 70 | 2.5 | 30 | | 10 | 15 | 30 | | |
| 200 | 160/40 | | 1 | 70 | 2.2 | 30 | | 10 | 20 | 30 | | |
| 200 | 160/40 | | 1 | 70 | 2.0 | 30 | | 10 | 30 | | | |
| 200 | 160/40 | | 1 | 70 | 1.8 | 30 | | 20 | 40 | | | |
| 200 | 160/40 | | 1 | 60 | 2.0 | 30 | | 10 | 30 | | | |
| 200 | 133/67 | | 1 | 60 | 1.8 | 30 | | 15 | 30 | | | 2.10 |
| 200 | 133/67 | | 2 (L-531) | 60 | 2.2 | 30 | | 15 | 2 | | | 2.27 |
| 200 | 133/67 | 15 | 2 | 60 | 2.4 | 30 | | 15 | 25 | | | 2.35 |
| 265 | 90/45 | | 2 | 60 | 2.4 | 20 | | 10 | 30 | | 1.85 | 1.98 |
| [1] 265 | 90/45 | | 2 | 60 | 2.6 | 20 | | 15 | 25 | | | |
| 265 | 108/27 | | 2 | 60 | 2.4 | 20 | | 10 | 30 | | | 2.14 |
| 265 | 108/27 | | 2 (Dow 201) | 60 | 2.6 | 50 | | 10 | 20 | | | 2.28 |
| 265 | 108/27 | | 2 | 60 | 2.4 | 30 | | 10 | 30 | | | 2.28 |
| 200 | 160/40 | | 1 | | 2.2 | 20 | 60 (LG-56) | 210 | 80 | | | |
| 200 | 160/40 | | 1 | | 2.4 | 20 | 60 | 50 | 40 | | | |
| 200 | 160/40 | | 1 | 30 | 2.2 | 20 | 30 | 45 | 50 | 60 | | |
| 200 | 160/40 | | 1 | 30 | 2.2 | 20 | 30 | 55 | 45 | | | |
| 200 | 160/40 | | 1 | 30 | 2.3 | 20 | 30 | 40 | 45 | | | 2.2 |
| 220 | 176/44 | | 1 | 30 | 2.4 | 30 | 30 (LK-380) | 30 | 35 | 60 | | |
| 220 | 176/44 | 22 | 1 | 30 | 2.7 | 20 | 30 | 35 | 45 | 60 | | |
| 220 | 176/44 | 22 | | 30 | 2.9 | 30 | 30 | 30 | 35 | | | 2.42 |
| 220 | 176/44 | 22 | 1 | 30 | 3.0 | 30 | 30 | 20 | 35 | | 1.9 | [2] 2.42 |
| 220 | 176/44 | | | 30 | 2.5 | 30 | 30 | 30 | 35 | | | |

[1] This composition contained in Mixture A an additional 25 grams of low molecular weight resinous condensate of epichlorohydrin and 2:2-di-p-hydroxyphenyl propane.
[2] After immersion for 2 days in boiling water under reflux a specimen of the foam showed no changes in structure.

Mixture B was added to Mixture A with vigorous stirring. The compositions and resulting foams are described in Table XXV.

TABLE XXV

| Aldol trimer of 2-formyl-3,4-dihydro-2H-pyran/trichloromonofluoromethane (80/20 by volume) (grams) | 3,4-dihydro-2H-pyran-2-methyl-(3,4-dihydro-2H-pyran-2-carboxylate) (grams) | Additive (grams) | Diphenylmethane diisocyanate (grams) | Silicone surfactant (Dow 201) (grams) | Castor oil (grams) | Boron trifluoride etherate (cc.) | Trichloromonofluoromethane (cc.) | Polyol (grams) | Induction time (sec.) | Rise time (sec.) | Tackfree time (sec.) |
|---|---|---|---|---|---|---|---|---|---|---|---|
| | | diglyceryl phthalate | | | | | | LG-168 | | | |
| 220 | 176 | 44 | 20 | 1 | | 3.0 | 20 | 50 | 150 | 45 | ------ |
| 220 | 176 | 44 | 20 | 1 | | *3.0 | 30 | 50 | 60 | 150 | ------ |
| | | Diallyl phthalate | | | | | | PeP-450 | | | |
| 220 | 220 | 20 | 22 | 2 | 30 | 3.2 | 15 | 30 | 150 | 90 | ------ |
| 220 | 220 | 10 | 22 | 2 | | 3.4 | 20 | 30 | 60 | 60 | ------ |
| | | Dimethyl phthalate | | | | | | | | | |
| 220 | 220 | 30 | 22 | 2 | 30 | 3.4 | 20 | 30 | 115 | 75 | ------ |
| 220 | 220 | 60 | 22 | 1 | 30 | 3.6 | 20 | 30 | 115 | 65 | ------ |
| | | Epon 828 | | | | | | | | | |
| 220 | 220 | 25 | 22 | 2 | 30 | 3.2 | 15 | 30 | 190 | 90 | 60 |
| 220 | 220 | 10 | 22 | 2 | 30 | 3.4 | 15 | 30 | 90 | 60 | 30 |
| | | Eponite 100 | | | | | | | | | |
| 220 | 220 | 10 | 22 | 2 | 30 | 3.4 | 20 | 30 | 120 | 60 | ------ |
| 220 | 220 | 30 | 22 | 2 | 30 | 3.6 | 20 | 30 | 60 | 110 | 30 |

* 1 cc. of dibutyltin dilaurate added to this composition.

Example 33

The following stock solution was prepared:

|  | Parts |
|---|---|
| Aldol trimer of 2-formyl-3,4-dihydro-2H-pyran admixed with trichloromonofluoromethane (80/20 by volume) | 50 |
| 3,4-dihydro-2H-pyran-2-methyl-(3,4-dihydro-2H-pyran-2-carboxylate) admixed with 2:2-di-p-hydroxyphenyl propane (80/20 by weight) | 50 |
| Diphenylmethane diisocyanate | 3 |

To 415 grams of the stock solution were added 1 gram of silicone surfactant Dow 201, 40 cc. of trichloromonofluoromethane and 3 cc. of boron-trifluoride etherate dissolved in 50 grams of castor oil and 10 grams of polypropylene glycol of molecular weight 425. The mixture was stirred vigorously and poured into a mould. After an induction period of 15 seconds, the foam rose for 25 seconds and became tackfree after 30 seconds. The foam had an overall density of 2.32 lbs./cu. ft. and measurements of the core indicated densities of 1.65 and 1.67 lbs./cu. ft. The closed cell content of the foam was 82.2%. The force required for 10% compression of the foam was 17.8 lbs./sq. in. parallel to the direction of rise and 8.7 lbs./sq. in. perpendicular to the direction of rise. The force required for 20% compression of the foam was 17.9 lbs./sq. in. parallel to the direction of rise and 9.7 lbs./sq. in. perpendicular to the direction of rise. The percentage change in dimensions of the foam under different conditions of temperature and relative humidity are shown in Table XXVI.

TABLE XXVI

| Condition | Percent Change in Dimension of Foam After— | | |
|---|---|---|---|
|  | 24 hours | 7 days | 28 days |
| 23° C., 50% R.H. | 0 | 0 | +1.4 |
| 100° C. | +3.4 | +15 | +26.5 |
| 70° C., 100% R.H. | +16 | +15 | −25 |
| −25° C. | 0 | −5.6 | −5 |

Example 34

The following stock solution was prepared:

|  | Parts |
|---|---|
| Aldol trimer of 2-formyl-3,4-dihydro-2H-pyran admixed with trichloromonofluoromethane (80/20 by volume) | 50 |
| 3,4-dihydro-2H-pyran-2-methyl-(3,4-dihydro-2H-pyran-2-carboxylate) admixed with 2:2-di-p-hydroxyphenyl propane (80/20 by weight) | 50 |

To 415 grams of the stock solution were added 1 gram of silicone surfactant Dow 201, 30 cc. of trichloromonofluoromethane and 2.4 cc. of borontrifluoride etherate dissolved in 60 grams of castor oil. The mixture was stirred vigorously and poured into a mould. After an induction period of 10 seconds the foam rose for 15 seconds. The foam had an overall density of 2.28 lbs./cu. ft. and measurements of the core indicated densities of 1.83 and 1.86 lb./cu. ft. The closed cell content was 86.0%. The force required for 10% compression of the foam was 13.5 lbs./sq. in. parallel to the direction of rise and 12.6 lbs./sq. in. perpendicular to the direction of rise. The force required for 20% compression of the foam was 14.0 lbs./sq. in. parallel to the direction of rise and 13.3 lbs./sq. in. perpendicular to the direction of rise. The percentage change in dimensions of the foam under different conditions of temperature and relative humidity are shown in Table XXVII.

TABLE XXVII

| Condition | Percent Change in Dimension of Foam After— | | |
|---|---|---|---|
|  | 24 hours | 7 days | 28 days |
| 23° C., 50% R.H. | −3 | −1.7 | +0.1 |
| 100° C. | −2.6 | +9.4 | +21.2 |
| 70° C., 100% R.H. | +11 | +13 | +5.7 |
| −25° C. | −3.7 | −5.5 | −5.5 |

Example 35

The following two mixtures were prepared:

| Mixture A | Mixture B |
|---|---|
| Aldol trimer of 2-formyl-3,4-dihydro-2H-pyran admixed with trichloromonofluoromethane (80/20 by volume), 200 grams. 3,4-dihydro-2H-pyran-2-methyl-(3,4-dihydro-2H-pyran-2-carboxylate) admixed with tetrachlorodiglycerylphthalate (80/20 by weight), 200 grams. Silicone surfactant Dow 201, 1 gram. | Trichloromonofluoromethane, 30 cc. Castor Oil, 60 grams. Borontrifluoride etherate, 2.2 cc. The borontrifluoride etherate was dissolved in the castor oil ingredient. |

Mixture B was added to Mixture A with vigorous stirring and the composition was poured into a mould. After an induction period of 10 seconds the foam rose for 35 seconds. The foam had an overall density of 2.25 lbs./cu. ft. and measurments of the core indicated densities of 1.86 and 1.71 lb./cu. ft. The closed cell content was 83.3%. The force required for 10% compression of the foam was 16.1 lbs./sq. in. parallel to the direction of rise and 7.76 lbs./sq. in. perpendicular to the direction of rise. The force required for 20% compression of the foam was 16.9 lbs./sq. in. parallel to the direction of rise and 9.46 lbs./sq. in. perpendicular to the direction of rise. Cubes of the foam of ¾ inch side were maintained in boiling water and were found to break down after 3 days.

Example 36

The following two mixtures were prepared:

| Mixture A | Mixture B |
|---|---|
| Aldol trimer of 2-formyl-3,4-dihydro-2H-pyran admixed with trichloromonofluoromethane (80/20 by volume), 220 grams. 3,4-dihydro-2H-pyran-2-methyl-(3,4-dihydro-2H-pyran-2-carboxylate) admixed with 2:2-di-p-hydroxyphenyl propane (80/20 by weight), 220 grams. Diphenylmethane diisocyanate, 22 grams. Silicone surfactant Dow 201, 1.5 grams. | Trichloromonofluoromethane, 25 cc. Castor oil, 30 grams. Triol LK-380, 30 grams. Borontrifluoride etherate, 2.8 cc. The borontrifluoride etherate was dissolved in the castor oil ingredient. |

Mixture B was added to Mixture A with vigorous stirring. The composition was poured into a mould. After an induction period of 15 seconds the foam rose for 25 seconds. The foam had an overall density of 2.38 lbs./cu. ft. and measurements of the core indicated densities of 1.87 and 1.81 lb./cu. ft. The force required for 10% compression of the foam was 28.4 lbs./sq. in. parallel to the direction of rise and 12.25 lbs./sq. in. perpendicular to the direction of rise. The force required for 20% compression of the foam was 29.1 lbs./sq. in. parallel to the direction of rise and 13.02 lbs./sq. in. perpendicular to the direction of rise. The percentage change in dimensions of the foam under different conditions of temperature and relative humidity are shown in Table XXVIII.

Cubes of the foam of ¾ inch side were maintained in boiling water for 7 days. The foam showed little shrinkage, contained no holes but was water-logged. The pH of the solution was 4.5.

TABLE XXVIII

| Conditions | Percent Change in Dimensions of Foam After— | | | |
|---|---|---|---|---|
| | 24 hours | 7 days | 28 days | 28 days+ 24 hours at 23° C., 50% R.H.* |
| 100° C | +4.18 | +12.17 | +7.6 | +3.6 |
| 70° C., 100% R.H. | +3.8 | +8.6 | +20.3 | +14.5 |
| −25° C | 0 | +1.82 | +5.4 | −0.9 |

*After 28 days under the conditions specified the samples were stored for 24 hours at 23° C. and 50% relative humidity.

Example 37

The following two mixtures were prepared:

| Mixture A | Mixture B |
|---|---|
| Aldol trimer of 2-formyl-3,4-dihydro-2H-pyran admixed with trichloromonofluoromethane (80/20 by volume), 220 grams. 3,4-dihydro-2H-pyran-2-methyl-(3,4-dihydro-2H-pyran-2-carboxylate) admixed with 2:2-di-p-hydroxyphenyl propane (80/20 by weight), 220 grams. Diphenylmethane diisocyanate, 22 grams. Silicone surfactant Dow 201, 2.0 grams. | Trichloromonofluoromethane, 25 cc. Castor oil, 30 grams. Hexol LS-490, 30 grams. Borontrifluoride etherate, 3.2 cc. The borontrifluoride etherate was dissolved in the castor oil ingredient. |

Mixture B was added to Mixture A with vigorous stirring and the composition was poured into a mould. After an induction period of 15 seconds the foam rose for 30 seconds. The foam had an overall density of 2.38 lbs./cu. ft. and measurements of the core indicated densities of 1.94 and 1.95 lbs./cu. ft. The force required for 10% compression of the foam was 26.77 lbs./sq. in. parallel to the direction of rise and 9.32 lbs/sq. in. perpendicular to the direction of rise. The force required for 20% compression of the foam was 26.70 lbs./sq. in. parallel to the direction of rise and 10.08 lbs./sq. in. perpendicular to the direction of rise. Cubes of the foam of ¾ inch side were maintained in boiling water for 6 days at which time the foam was ⅓ waterlogged but showed no change in shape. After an additional day of exposure in boiling water a few holes and some shrinkage of the foam was noticed. The weight loss after 7 days exposure to boiling water was 17.5%. The pH of the aqueous solution was 4–5.

Example 38

The following two mixtures were prepared:

| Mixture A | Mixture B |
|---|---|
| Aldol trimer of 2-formyl-3,4-dihydro-2H-pyran admixed with trichloromonofluoromethane (80/20 by volume), 220 grams. 3,4-dihydro-2H-pyran-2-methyl-(3,4-dihydro-2H-pyran-2-carboxylate) admixed with 2:2-di-p-hydroxyphenyl propane (80/20 by weight), 220 grams. Diphenylmethane diisocyanate, 22 grams. Silicone surfactant Dow 201, 2.0 grams. | Trichloromonofluoromethane, 20 grams. Castor oil, 30 grams. Polyol PeP 450, 30 grams. Borontrifluoride etherate, 2.8 cc. The borontrifluoride etherate was dissolved in the castor oil. |

Mixture B was added to Mixture A with vigorous stirring. The composition was poured into a mould. After an induction period of 15 seconds the foam rose for 45 seconds. The foam had an overall density of 2.32 lbs./cu. ft. and measurements of the core indicated densities of 1.97 and 1.89 lb./cu. ft. The force required for 10% compression of the foam was 27.51 lbs./sq. in. parallel to the direction of rise and 9.29 lbs./sq. in. perpendicular to the direction of rise. The force required for 20% compression of the foam was 26.98 lbs./sq. in. parallel to the direction of rise and 10.39 lbs./sq. in. perpendicular to the direction of rise. The percentage change in dimensions of the foam under different conditions of temperature and relative humidity are shown in Table XXIX.

TABLE XXIX

| Conditions | Percent Change in Dimensions of Foam After— | | | |
|---|---|---|---|---|
| | 24 hours | 7 days | 28 days | 28 days+ 24 hours at 23° C., 50% R.H. |
| 100° C | +6.6 | +17 | +24.3 | +19.8 |
| 70° C, 100% R.H. | +17 | +17.3 | +16.6 | +7.14 |
| −25° C | −0.9 | −5.4 | 0 | −1.8 |

Example 39

The following two mixtures were prepared:

| Mixture A | Mixture B (proportions as in Table XXX) |
|---|---|
| Aldol trimer of 2-formyl-3,4-dihydro-2H-pyran admixed with trichloromonofluoromethane (80/20 by volume), 220 parts. 3,4-dihydro-2H-pyran-2-methyl-(3,4-dihydro-2H-pyran-2-carboxylate) admixed with pentachlorophenol (9/1 by weight), 220 parts. Diphenylmethane diisocyanate, 22 parts. Silicone surfactant Dow 201 or Dow 202, 1.5 parts. | Trichloromonofluoromethane. Caster oil. Borontrifluoride etherate. The borontrifluoride etherate was dissolved in the castor oil. |

Mixture B was added to Mixture A with vigorous stirring and the composition poured into a mould. The composition and characteristics of three foams are shown in Table XXX.

Example 40

The following two mixtures were prepared:

| Mixture A | Mixture B |
|---|---|
| Aldol trimer of 2-formyl-3,4-dihydro-2H-pyran admixed with trichloromono-fluoromethane (80/20 by volume), 2,500 grams. 3,4-dihydro-2H-pyran-2-methyl-(3,4-dihydro-2H-pyran-2-carboxylate) admixed with 2:2-di-p-hydroxyphenyl propane (90/10 by weight), 2,500 grams. Silicone surfactant Dow 201, 17 grams. | Castor oil, 900 grams. Pentachlorophenol, 100 grams. In addition there was employed trichloromono-fluoromethane and borontrifluoride etherate in quantities shown in Table XXXI. |

Mixture B was added to Mixture A with vigorous stirring and the mixed composition poured into a heated mould. The compositions and characteristics of four resulting foams are shown in Table XXXI.

The surfactants designated as L-520, L-530, L-531, Dow 199, Dow 201, and Dow 202 are siloxane oxyalkylene copolymer type silicone surfactants. Although the exact structures are not known it is believed that in the case of surfactants L-520 and Dow 199 the siloxane and oxyalkylene portions are linked by a —Si—O—C— group. In the case of surfactants L-530, L-531, Dow 201 and Dow 202 it is believed that the siloxane and oxyalkylene portions are linked by a divalent hydrocarbon group.

TABLE XXX

| Mixture A (grams) | Castor oil (grams) | Borontrifluoride etherate (ml.) | Trichloromonofluoromethane (cc.) | Induction period (sec.) | Rise time (sec.) | Density (lb./sq. ft.) | Force for 10% compression, parallel to rise direction (lb./sq. in.) | Force for 10% compression, perpendicular to rise direction (lb./sq. in.) | Force for 20% compression, parallel to rise direction (lb./sq. in.) | Force for 20% compression, perpendicular to rise direction (lb./sq. in.) |
|---|---|---|---|---|---|---|---|---|---|---|
| 463.5 | 60 | 3.2 | 20 | 20 | 45 | ---------- | ---------- | ---------- | ---------- | ---------- |
| 463.5 | 50 | 3.2 | 20 | 15 | 45 | ---------- | ---------- | ---------- | ---------- | ---------- |
| *463.5 (Dow 202) | 50 | 3.2 | 30 | 15 | 45 | Overall 2.4 Core 1.91 | 22.2 | 12.53 | 22.32 | 13.49 |

*Preheated mould.

TABLE XXXI

| Mixture A (grams) | Mixture B (grams) | Borontrifluoride etherate (ml.) | Trichloromonofluoromethane (ml.) | Induction period (sec.) | Rise time (sec.) | Density (overall) (lb./cu. ft.) | Density (core) (lb./cu. ft.) | Force required for 10% and 20% compression parallel to rise direction (lb./sq. in.) | Force required for 10% and 20% compression perpendicular to rise direction (lb./sq. in.) | Closed cell content (percent) |
|---|---|---|---|---|---|---|---|---|---|---|
| 463.5 | 60 | 2.8 | 15 | 10 | 20 | 2.5 | 1.93 | 36.5 (10%) 31.27 (20%) | 18.59 (10%) 17.46 (20%) | ------ |
| 441.5 | [1] 60 | 2.6 | 15 | 15 | 35 | 2.4 | 1.96 | 30.23 (10%) 28.20 (20%) | 11.81 (10%) 12.12 (20%) | ------ |
| [2] 350 | [1] 54 | 2.9 | 35 | 5 | 25 | 2.2 | 1.7 | ---------------- | 15 (10%) 16 (20%) | 76.5 |
| [2] 350 | 54 | 2.9 | 30 | 10 | 25 | 2.2 | 1.7 | ---------------- | 16 (10%) 17 (20%) | 76.9 |

[1] Castor oil/pentachlorophenol ratio was 3/1.  [2] 20 grams of diphenylmethane diisocyanate added.

| Percent Change in Dimensions of Foam After Exposure to Changing Temperature and Relative Humidity |||||||||||||
|---|---|---|---|---|---|---|---|---|---|---|---|---|
| 23° C., 50% R.H. || 100° C. |||| 70° C., 100% R.H. |||| −25° C. ||||
| After 24 Hours | After 7 Days | After 24 Hours | After 7 Days | After 28 Days | After 28 Days+ 24 Hours* | After 24 Hours | After 7 Days | After 28 Days | After 28 Days+ 24 Hours* | After 24 Hours | After 7 Days | After 28 Days | After 28 Days+ 24 Hours* |
| -------- | -------- | +2.0 | +4.7 | +11.7 | +7.3 | +2.6 | +6.0 | +16.4 | +4.3 | +3.95 | −1.88 | +4.5 | −0.8 |
| -------- | -------- | +4.35 | +10.0 | +16.6 | +12.25 | +8.15 | +11.6 | +20.4 | −0.4 | −0.8 | 0 | +3.0 | −2.6 |
| −0.35 | −0.35 | −1.0 | −4.3 | -------- | -------- | −10.0 | −12.0 | -------- | -------- | −1.8 | −4.2 | -------- | -------- |
| +2.0 | +1.4 | +2.9 | +8.9 | -------- | -------- | +7.2 | +12.0 | -------- | -------- | −1.5 | −1.0 | -------- | -------- |

*After 28 days under the condition specified the samples were stored for 24 hours at 23° C. and 50% relative humidity.

STABILITY OF FOAM WHEN EXPOSED TO BOILING WATER

After 4 days in boiling water—No change.
After 7 days in boiling water—Some shrinkage, a few holes and weight loss of 14%: pH of solution, 4.8.
After 3 days in boiling water—No change.
After 7 days in boiling water—Little shrinkage and weight loss of 15.9%: pH of solution, 5.
After 7 days in boiling water—weight loss of 14.3%; pH of solution, 5.6.
After 7 days in boiling water—weight loss of 13.8%; pH of solution, 5.8.

What we claim is:

1. A foamed cellular polymeric material which is the reaction product of a foamable composition comprising (A) a dihydropyranyl group-containing compound having the dihydropyranyl groups linked by ester groups, (B) a dihydropyranyl group-containing compound constituted by the aldol condensation product of a dihydropyran carboxaldehyde, the relative proportions of (A) and (B) lying within the range of 10 to 1 and 1 to 10 by weight, (C) 0.005% to 2.0%, by weight of the composition, of a catalyst capable of promoting the polymerization reaction of (A) and (B), and (D) 2% to 30%, by weight of the composition, of a foaming agent vaporizing at the temperature of the polymerization reaction.

2. A foamed cellular polymeric material as claimed in claim 1 wherein the foamable composition contains up to 30% by weight of a material reactive with the ethylenic double bonds of its dihydropyranyl ingredients.

3. A foamed cellular polymeric material as claimed in claim 2 wherein the material reactive with the ethylenic double bonds of the dihydropyranyl ingredients of the foamable composition is a member selected from the group consisting of polyhydric phenols, chlorinated phenols, polyhydric alcohols, epoxidized materials, $\alpha,\beta$-monoethylenically unsaturated compounds and organic diisocyanates.

4. A foamed cellular polymeric material as claimed in claim 1 wherein the ingredient of the foamable composition having its dihydropyranyl groups linked by ester groups is 3,4-dihydro-2H-pyran-2-methyl-(3,4-dihydro-2H-pyran-2-carboxylate).

5. A foamed cellular polymeric material as claimed in claim 1 wherein the ingredient of the foamable composition which is the aldol condensation product of a dihydropyran carboxaldehyde is the trimeric aldol condensation product of 2-formyl-3,4-dihydro-2H-pyran.

6. A foamed cellular polymeric material as claimed in claim 1 wherein the catalyst ingredient of the foamable composition is a member selected from the group consisting of boron trifluoride etherate, boron trifluoride dihydrate and mixtures of fluoboric acid and fluosilicic acid.

7. A process which comprises mixing, essentially (A) a dihydropyranyl group-containing compound having the dihydropyranyl groups linked by ester groups, (B) a dihydropyranyl group-containing compound constituted by the aldol condensation product of a dihydropyran carboxaldehyde, the relative proportions of (A) and (B) lying within the range of 10 to 1 and 1 to 10 by weight, (C) a catalyst capable of promoting the polymerization reaction of (A) and (B), and (D) a foaming agent vaporizing at the temperature of the polymerization reaction, and allowing the mixture naturally to self-expand into a foamed cellular polymeric material.

8. A process as claimed in claim 7 wherein there is incorporated into the expandable mixture a material reactive with the ethylenic double bonds of the dihydropyranyl compounds.

References Cited
UNITED STATES PATENTS

| | | | |
|---|---|---|---|
| 3,311,574 | 3/1967 | Bowering et al. | 260—2.5 |
| 3,311,575 | 3/1967 | Graham | 260—2.5 |

MURRAY TILLMAN, *Primary Examiner.*

SAMUEL H. BLECH, *Examiner.*

J. C. BLEUTGE, *Assistant Examiner.*